United States Patent
Komma et al.

(10) Patent No.: US 7,508,742 B2
(45) Date of Patent: Mar. 24, 2009

(54) OPTICAL PICK-UP, OPTICAL DISK APPARATUS AND INFORMATION PROCESSING APPARATUS

(75) Inventors: Yoshiaki Komma, Hirakata (JP); Eishin Mori, Kyoto (JP); Naoya Hotta, Sagamihara (JP)

(73) Assignee: Panasonic Corporation, Osaka (JP)

( * ) Notice: Subject to any disclaimer, the term of this patent is extended or adjusted under 35 U.S.C. 154(b) by 581 days.

(21) Appl. No.: 10/902,680

(22) Filed: Jul. 28, 2004

(65) Prior Publication Data

US 2005/0002292 A1    Jan. 6, 2005

Related U.S. Application Data

(62) Division of application No. 09/898,781, filed on Jul. 3, 2001, now Pat. No. 6,928,035.

(30) Foreign Application Priority Data

Jul. 7, 2000    (JP)    ............................. 2000-207001

(51) Int. Cl.
      *G11B 7/00* (2006.01)
(52) U.S. Cl. ..................................... 369/53.2
(58) Field of Classification Search ................ 369/53.2, 369/53.22, 53.23, 44.37, 44.41, 44.42, 112.05
      See application file for complete search history.

(56) References Cited

U.S. PATENT DOCUMENTS

| | | | | |
|---|---|---|---|---|
| 5,859,822 A | * | 1/1999 | Inoue et al. | ............... 369/53.22 |
| 5,894,464 A | | 4/1999 | Kim et al. | |
| 5,903,531 A | * | 5/1999 | Satoh et al. | ............... 369/53.23 |
| 5,956,312 A | | 9/1999 | Ishihara | |
| 5,963,523 A | * | 10/1999 | Kayama et al. | ........... 369/53.22 |
| 5,978,404 A | | 11/1999 | Ishihara | |
| 6,072,579 A | | 6/2000 | Funato | |
| 6,130,872 A | | 10/2000 | Sugiura et al. | |
| 6,285,635 B1 | * | 9/2001 | Watanabe et al. | ........ 369/44.27 |
| 6,424,605 B1 | * | 7/2002 | Iida | .......................... 369/53.23 |
| 6,512,608 B2 | | 1/2003 | Ohyama | |

(Continued)

FOREIGN PATENT DOCUMENTS

JP    04325322 A    * 11/1992

(Continued)

*Primary Examiner*—Thang V Tran
(74) *Attorney, Agent, or Firm*—Hamre, Schumann, Mueller & Larson, P.C.

(57) ABSTRACT

An optical pick-up capable of reproducing information excellently on both CD and DVD, which are significantly different in terms of three kinds of factors, a base material thickness, a wavelength of a light source, and NA, and detecting TE signals by three kinds of methods, that is, the phase difference method, the PP method, and the 3-beam method, which are necessary to record and reproduce information. The optical pick-up is formed by integrating laser light sources having two kinds of wavelengths ($\lambda 1$, $\lambda 2$) for detecting TE signals; photodetectors, and hologram for generating the diffracted light for detecting signals. The distance d1 between the center of the photo detecting portion PD0 and the light emitting spot of the first semiconductor laser light source and a distance d2 between the center of the photo detecting portion PD0 and the light emitting spot of the second semiconductor laser light source substantially satisfy the following relationship:

$\lambda 1/\lambda 2 = d1/d2$.

5 Claims, 20 Drawing Sheets

U.S. PATENT DOCUMENTS 6,747,931 B1 * 6/2004 Park .................. 369/53.23

FOREIGN PATENT DOCUMENTS

| | | |
|---|---|---|
| JP | 05085274 A * | 4/1993 |
| JP | 9-120568 | 5/1997 |
| JP | 10-21577 | 1/1998 |
| JP | 10-64107 | 3/1998 |
| JP | 10-321961 | 4/1998 |
| JP | 10-124918 | 5/1998 |
| JP | 10-134388 | 5/1998 |
| JP | 10-149559 | 6/1998 |
| JP | 10-241189 | 9/1998 |
| JP | 10-289468 | 10/1998 |
| JP | 10-319318 | 12/1998 |
| JP | 2000011417 | 1/2000 |

* cited by examiner

OPTICAL PICK-UP, OPTICAL DISK APPARATUS AND INFORMATION PROCESSING APPARATUS

This application is a divisional of application Ser. No. 09/898,781, filed 3 Jul. 2001, entitled OPTICAL PICK-UP, OPTICAL DISK APPARATUS AND INFORMATION PROCESSING APPARATUS, which application(s) are incorporated herein by reference.

BACKGROUND OF THE INVENTION

1. Field of the Invention

The present invention relates to an optical pick-up used for recording/reproducing or erasing information on an optical disk, an optical disk apparatus, and an information processing apparatus using the same.

2. Description of the Prior Art

Optical memory technology that uses optical disks having a pit pattern as high-density, large-capacity information storage media has been expanding its application from digital audio disks to video disks, document file disks, and further to data files, etc. In recent years, a high-density optical disk such as DVD-ROM etc. using a visible red laser of wavelength of 630 nm to 670 nm as a light source has become prevalent. Furthermore, an optical disk (DVD-RAM) capable of high density recording has been commercialized. A large capacity of digital data has been able to be recorded on an optical disk easily. Furthermore, CD-R that is highly compatible with CD, which has been used broadly, has been prevalent.

From the above mentioned background, in the information reproducing apparatus using DVD, in addition to DVD-ROM and CD, the reproduction on DVD-RAM and CD-R is important. In the information recording and reproducing apparatus using DVD, in addition to the recording and reproducing function on DVD-RAM, the reproduction on DVD-ROM, CD and CD-R is important.

Since recording/reproducing information on CD-R is carried out by the use of the change in the reflectance of light colors and is optimized to a wavelength of about 800 nm, in other wavelengths of light such as visible light, signals may not be reproduced. Therefore, in order to reproduce information on CD-R, it is desirable that an infrared light source having a wavelength of about 800 nm is used. The optical pick-up provided with a red semiconductor laser for DVD and an infrared semiconductor laser for CD and CD-R has been developed. For simplifying the optical system so as to realize miniaturization and low cost, it is proposed that the above-mentioned two kinds of semiconductor lasers, each having a different wavelength, are integrated into one package.

Referring to FIGS. 20 and 21, an optical pick-up disclosed in JP 10 (1998)-289468 A will be described. FIG. 20 is a schematic view showing a configuration of an optical pick-up 200. In formation recording/reproduction is performed on an optical disk 7. There are a plurality of optical disks having a transparent substrate 220 with different thickness. Recording/reproduction herein denotes recording information on an information recording surface 240 of the optical disk 7 or reproducing information on the information recording surface 240. A conventional optical pick-up apparatus 200 has a first semiconductor laser 100a (wavelength λ=610 nm to 670 nm) as a first light source and a second semiconductor laser 100b (wavelength λ=740 nm to 830 nm) as a second light source. This first semiconductor laser 100a is a light source used for recording/reproducing information on DVD and the semiconductor laser 100b is a light source used for recording/reproducing information on the second optical disk. These semiconductor lasers are used depending upon the kinds of optical disks on which recording/reproducing is performed.

A synthesizer 210 synthesizes a light flux emitted from the first semiconductor laser 100a and a light flux emitted from the second semiconductor laser 100b into one identical optical path (which may be substantially the same optical path) to converge the synthesized light flux onto the optical disk 7 via a converging optical system mentioned below. By using a polarizing prism (a birefringent plate) as the synthesizer 210, the light flux emitted from the first semiconductor laser 100a is allowed to pass through the optical path without changing the optical path as an ordinary ray, and the light flux emitted from the second semiconductor laser 100b is allowed to change the optical path as an abnormal ray. This synthesizer 210 may be a hologram.

The optical converging system including an objective lens 60 and a collimating lens 50 is a means for converging a light flux emitted from the semiconductor laser and forming a light spot on the information recording surface 240 via the transparent substrate 220 of the optical disk 7. An aperture stop 150 limits the light flux to the predetermined number of apertures.

A unit 160 includes a hologram 40 and a photodetector 800, etc. in addition to the first semiconductor laser 100a and the second semiconductor laser 100b, which is shown in detail in FIG. 21. In the unit 160, the first semiconductor laser 100a, the second semiconductor laser 100b and the photodetector 800 are arranged in one plane. A further photodetector 230 is arranged for detecting the light from the semiconductor laser rear part. This photodetector 230 is used for current control of the semiconductor laser with an APC (auto power control) circuit based on the amount of light emitted from a rear part of the semiconductor laser.

Furthermore, in this configuration, a focus error signal is detected by a knife edge method. Therefore, on a photo-receiving surface of the photo detector 800, eight photo receiving elements (photo receiving surfaces), A1-D1, A2-D2 are provided. Furthermore, as a photo diverging means, the hologram 40 is used. This hologram element is divided into four parts such as A to D, and the hologram is arranged so that the light beams passing through the divided surfaces are focused on the photo receiving surface of the photo detecting means 800.

Similarly, for the purpose of achieving the small size optical pick up capable of recording/reproducing information on DVD, CD, CD-R, a configuration in which a photo detector and two semiconductor laser chips each having different wavelength are integrated into one unit is disclosed in besides JP10 (1998)-289468A, JP10 (1998)-319318A, JP 10 (1998)-21577 A, JP 10 (1998)-64107 A, JP 10 (1998)-321961 A, JP 10 (1998)-134388 A, JP10 (1998)-149559A, JP10 (1998)-241189A, JP10 (1998)-124918A, JP10 (1998)-120568 A, JP12 (2000)-11417 A, etc.

The category of DVD includes DVD-RAM, in addition to DVD-ROM. Therefore, it is desirable that recording or reproducing apparatus by the use of DVD can reproduce information on DVD-ROM, DVD-RAM, CD-ROM, and CD-R (CD-RECORDABLE), the latter two of which have been prevalent. Each of these disks has respective standardizations, and the standardization defines respective tracking error (TE) signal detection methods capable of reproducing information stably.

A TE signal of the DVD-ROM can be obtained by the phase difference detection method. The phase difference detection method also is referred to as a differential phase detection (DPD) method. By using the change in the strength of far field pattern (FFP) returning from the optical disk by reflection/ diffraction, the TE signal can be obtained with one beam. The method uses a change of the diffracted light by the two-dimensional arrangement of pits. The change of the distribution of the light amount in the diffraction by pit rows is detected by the 4-divided photodetector to compare the phases, thereby obtaining the TE signal. This method is suitable for a reproduction only disk having pit rows.

A TE signal of the DVD-RAM can be obtained by a push-pull (PP) method. The PP method is used mainly for a rewritable optical disk and a write once type optical disk. When the guide groove of the optical disk recording surface of the optical disk is irradiated with a converged light spot, the reflected light accompanies a diffracted light in the direction in which the guide groove extends and the direction perpendicular to the guide groove. The FFP returning to surface of the objective lens has an optical intensity distribution due to the interference of the ±first order diffracted light and zero order diffracted light in the guide groove. Depending upon the positional relationship between the guide grooves and the converging spot, one part of the FFP becomes bright and another part of the FFP becomes dark, or on the contrary, one part of the FFP becomes dark and another part of the FFP becomes bright. TE signals can be obtained by the PP method by detecting the change in the optical intensity by using the 2-divided photodetector.

In both the CD-ROM (which includes CD for audio) and CD-R, TE signals can be obtained by the PP method from the viewpoint of standard. However, as compared with DVD-RAM, the strength of TE signals is weak. Furthermore, the PP method has a problem in that a TE signal offset occurs due to the lens shift. In DVD-RAM, in order to avoid such a problem, an offset compensation zone for TE signals is provided on a part of the information recording surface. However, there is no means for solving the problem of offset in the case of CD-ROM or CD-R. Therefore, as the TE signal detection method, usually a 3-beam method is used in CD-ROM or CD-R.

In the 3-beam method, the grating is inserted into the outward path from a light source to an optical disk and zero order diffracted beam (main beam) and ±first diffracted light beams (sub-beams) of the grating are formed on the optical disk. When the main beam is deviated from the center of the track, one of the sub-beams approaches to the center of the track and the other sub-beam is distant from the center of the track, thus causing the difference in the amount of reflected return light. By detecting this difference, TE signals can be obtained.

As mentioned above, for recording or reproducing information on DVD-ROM, DVD-RAM, and CD-ROM, CD-R, it is necessary to carry out three kinds of methods, i.e., the phase difference method, PP method, 3-beam method. However, in conventional methods, there is no specific example of the configuration capable of corresponding to three types of TE signals detection methods, i.e. the phase difference method, PP method, and 3-beam method.

Furthermore, DVD and CD have different thickness of transparent substrates covering the information recording surface. The standard substrate thickness of DVD is 0.6 mm and the standard substrate thickness of CD is 1.2 mm. By converging light by the use of the common optical converging system common in the optical disk having substrates each having different thickness, a spherical aberration that is an aberration symmetrical with respect to the optical axis, occurs. A large number of methods for recording/reproducing information on DVD and CD by the use of a common light converging system are proposed. Furthermore, DVD has a higher recording density than CD, and even if the red laser light source with a short wavelength is used, the necessary numerical aperture (NA) of the lens is 0.6, which is larger than the NA for CD (0.45). A conventional method such as JP10 (1998)-289468 A discloses a configuration in which the NA is reduced as compared with the NA when reproducing information on CD by using the aperture stop 150.

As mentioned above, information reproduction on CD and DVD are carried out under the remarkably different optical conditions of thickness of substrate, wavelength of light source and NA. Therefore, like in a conventional method, when reproducing information on CD and DVD, in a configuration in which FE signals are detected from the common photo-receiving dividing regions, due to the difference in the optical properties such as the above-mentioned items, the deterioration of properties, for example, FE signal offset, deterioration of FE signal amplitude (signal strength) and the like, occur. Furthermore, in the configuration in which, as shown in FIG. 22 of JP9 (1997)-120568 A (FIG. 5(a) of JP9 (1997)-120568 A), diffracted lights entering in the different positions on the photodetector due to the difference in the wavelength are received by a continuous photodetector region (for example, 800D), the area of each photodetector region becomes larger, and thus the electric capacitance of the photodetector region is increased, signals of high frequency cannot be detected, and signals cannot be reproduced at high speed.

Furthermore, a configuration suitable for obtaining the excellent signal when reproducing information on DVD and CD, considering a difference in the wavelength and the position of the light emitting spots has not conventionally been considered.

SUMMARY OF THE INVENTION

In order to solve the above-mentioned conventional problems, a first optical pick-up of the present invention includes a first semiconductor laser light source for emitting a light beam with wavelength $\lambda 1$; a second semiconductor laser light source for emitting a light beam with wavelength $\lambda 2$; a converging optical system for receiving the light beams emitted from the first and second semiconductor laser light sources and for converging the received light beams into a microscopic spot on an optical disk; a diffractive element for diffracting the light beam reflected by the optical disk; and a photo detecting portion for receiving the diffracted light diffracted by the diffractive element and for outputting an electric signal proportional to the amount of the diffracted light, wherein the photo detecting portion includes a photo detecting portion PD0 for receiving a +first order diffracted light from the diffractive element, and wherein a distance d1 between the center of the photo detecting portion PD0 and the light emitting spot of the first semiconductor laser light source and a distance d2 between the center of the photo detecting portion PD0 and the light emitting spot of the second semiconductor laser light source substantially satisfy the following relationship:

$$\lambda 1/\lambda 2 = d1/d2.$$

According to the above-mentioned optical pickup, the photo detecting portion can be shared by both wavelengths, and the number of the photo detecting portions can be reduced. Therefore, it is possible to reduce the area of the photodetector and the number of the circuit elements converting output signals into current/voltage signals, thus enabling the cost reduction and the miniaturization of the apparatus to be realized.

A second optical pick-up of the present invention includes a first semiconductor laser light source for emitting a light beam with wavelength λ1; a second semiconductor laser light source for emitting a light beam with wavelength λ2; a converging optical system for receiving the light beams emitted from the first and second semiconductor laser light sources and for converging the received light beams into a microscopic spot on an optical disk; a diffractive element for diffracting the light beam reflected by the optical disk; and a photo detecting portion for receiving the diffracted light diffracted by the diffractive element and for outputting an electric signal proportional to the amount of the diffracted light, wherein the photo detecting means includes a photo detecting portion PD0 for receiving a +first order diffracted light from the diffractive element, and a distance d1 between the center of the photo detecting portion PD0 and the light emitting spot of the first semiconductor laser light source and a distance d2 between the center of the photo detecting portion PD0 and the light emitting spot of the second semiconductor laser light source, and a distance d12 between the light emitting spots of the first and second semiconductor laser light sources satisfy the following relationship:

$$d2=d1+d12$$

and substantially satisfy the following relationships:

$$d1=\lambda 1 \cdot d12/(\lambda 2-\lambda 1)$$

$$d2=\lambda 2 \cdot d12/(\lambda 2-\lambda 1).$$

According the above-mentioned optical pick-up, with respect to the predetermined distance between the light emitting spots and wavelength, the photo detecting portion can be shared by both wavelengths, and the number of the photo detecting portions can be reduced. Therefore, it is possible to reduce the area of the photodetector and the number of the circuit elements converting output signals into current/voltage signals, thus enabling the cost reduction and the miniaturization of the apparatus to be realized.

A third optical pick-up of the present invention includes a first semiconductor laser light source for emitting a light beam with wavelength λ1; a second semiconductor laser light source for emitting a light beam with wavelength λ2; a converging optical system for receiving the light beams emitted from the first and second semiconductor laser light sources and for converging the received light beam into a microscopic spot on an optical disk; a diffractive element for diffracting a light beam reflected by the optical disk; and a photo detecting portion for receiving the diffracted light diffracted by the diffractive element and for outputting an electric signal proportional to the amount of the diffracted light, wherein the photo detecting portion includes a photo detecting portion PD1 for receiving a −first order diffracted light of the light beam with wavelength λ1 in the diffracted light diffracted by the diffractive element, and a photo detecting portion PD2 for receiving a −first order diffracted light of the light beam with wavelength λ2 in the diffracted light diffracted by the diffractive element, and the photo detecting portion PD1 and the photo detecting portion PD2 are divided into a plurality of regions respectively, and wherein when information reproduction is carried out by the use of the light with wavelength λ1, signals obtained from the regions of the photo detecting portion PD1 are calculated to detect a focus error signal, and when the information reproduction is carried out by the use of the light with wavelength λ2, signals obtained from the regions of the photo detecting portion PD2 are calculated to detect a focus error signal.

According to the above-mentioned optical pick-up, since there are photo detecting portions each corresponding to the respective light source with wavelength, the recording or reproducing information on any of different kinds of optical disks corresponding to each wavelength, for example, any of DVD (DVD-ROM, DVD-ROA) and CD (CD-ROM, CD-R), it is prevent the deterioration of property of the focus error signal. Furthermore, since each region is divided into a plurality of sections, by calculating the difference of the magnitude of the diffracted light of each region, focus error signal can be obtained.

In the third optical pick-up of the present invention, the shape of the photo detecting portion PD1 is different from the shape of the photo detecting portion PD2. According to the above-mentioned optical pick-up, even if information is recorded/reproduced on an optical disk having a different base material thickness, the offset of the focus error signal can be prevented.

Furthermore, it is preferable that the photo detecting portion PD1 and the photo detecting portion PD2 are divided into a plurality of regions by dividing lines, and a symmetrical central line parallel to the dividing line of the photo detecting portion PD2 and a symmetrical central line parallel to the dividing line of the photo detecting portion PD1 are deviated from each other in the direction perpendicular to each symmetrical central line. According to the above-mentioned optical pick-up, even if information is recorded/reproduced on an optical disk having a different base material thickness, the offset of the focus error signal can be prevented.

A fourth optical pick-up of the present invention includes a first semiconductor laser light source for emitting a light beam with wavelength λ1; a second semiconductor laser light source for emitting a light beam with wavelength λ2; a converging optical system for receiving the light beams emitted from the first and second semiconductor laser light sources and for converging the received light beam into a microscopic spot on an optical disk; a diffractive element for diffracting a light beam reflected by the optical disk; and a photo detecting portion for receiving the diffracted light diffracted by the diffractive-element and for outputting an electric signal proportional to the amount of the diffracted light, wherein the photo detecting portion includes a photo detecting portion PD1 for receiving a −first order diffracted light of the light beam with wavelength λ1 in the diffracted light diffracted by the diffractive element, and a photo detecting portion PD2 for receiving a −first order diffracted light of the light beam with wavelength λ2 in the diffracted light diffracted by the diffractive element; and a distance d1 between the center of the photo detecting portion PD1 and the light emitting spot of the first semiconductor laser light source and a distance d2 between the center of the photo detecting portion PD2 and the light emitting spot of the second semiconductor laser light source substantially satisfy the following relationship:

$$\lambda 1/\lambda 2=d1/d2.$$

According to the above-mentioned fourth optical pick-up, since there are photo detecting portions PD1 and PD2 each corresponding to respective wavelength of the light sources, the photo detecting portions PD1 and PD2 can be used for the photo detecting portions for detecting focus error signals of the different kinds of optical disks each corresponding to a respective wavelength.

In the above-mentioned fourth optical pick-up of the present invention, it is preferable that when d12 denotes a distance between the light emitting spot of the first semiconductor laser light source and the light emitting spot of the second semiconductor laser light source, a gap between the center of the photo detecting portion PD1 and the center of the photo detecting portion PD2 is set to be twice d12. With such an optical pick-up, the center of each photo detecting portion and the center of the diffracted light can be accorded with each other and the light can be received without leakage even if there is an error in the change of the wavelength.

Furthermore, it is preferable that the photo detecting portion PD1 and the photo detecting portion PD2 are divided into a plurality of regions respectively, and when information reproduction is carried out by the use of the light with wavelength $\lambda 1$, signals obtained from the regions of the photo detecting portion PD1 are calculated to detect a focus error signal, and when the information reproduction is carried out by the use of the light with wavelength $\lambda 2$, signals obtained from the regions of the photo detecting portion PD2 are calculated to detect a focus error signal. With such an optical pick-up, since the focus error signals are detected in each photo detecting portion corresponding to each wavelength of the light sources, it is possible to prevent the deterioration of the focus error signal property. Furthermore, since each region is divided into a plurality of regions, by calculating the difference of the magnitude of the diffracted light of each region, the focus error signals can be obtained.

Furthermore, it is preferable that the shape of the photo detecting portion PD1 is different from the shape of the photo detecting portion PD2. With such an optical pick-up, even if information is recorded/reproduced on an optical disk having a different base material thickness, the offset of the focus error signal can be prevented.

Furthermore, it is preferable that the photo detecting portion PD1 and the photo detecting portion PD2 are divided into a plurality of regions by dividing lines, and a symmetrical central line parallel to the dividing line of the photo detecting portion PD2 and a symmetrical central line parallel to the dividing line of the photo detecting portion PD1 are deviated from each other in the direction perpendicular to each symmetrical central line.

A fifth optical pick-up of the present invention includes a first semiconductor laser light source for emitting a light beam with wavelength $\lambda 1$; a second semiconductor laser light source for emitting a light beam with wavelength $\lambda 2$; a converging optical system for receiving the light beams emitted from the first and second semiconductor laser light sources and for converging the received light beam into a microscopic spot on an optical disk; a diffractive element for diffracting a light beam reflected by the optical disk; and a photo detecting portion for receiving the diffracted light diffracted by the diffractive element and for outputting an electric signal proportional to the amount of the diffracted light, wherein the photo detecting portion includes a photo detecting portion PD1 for receiving a −first order diffracted light of the light beam with wavelength $\lambda 1$ in the diffracted light diffracted by the diffractive element; a photo detecting portion PD2 for receiving a −first order diffracted light of the light beam with wavelength $\lambda 2$ in the diffracted light diffracted by the diffractive element; and a photo detecting portion PD0 for receiving a +first order diffracted light of the light beams with wavelength $\lambda 1$ and wavelength $\lambda 2$. According to the above-mentioned optical pick-up, since there are photo detecting portion PD0, and photo detecting portions PD1, PD2, each corresponding to the respective wavelength, it is possible to use the photo detecting portion PD0 shared by both wavelengths as a photo detecting portion for detecting tracking error signals and to use the photo detecting portions PD1, PD2 as a photo detecting portion for detecting focus error signals of different kinds of optical disks corresponding to each wavelength.

In the above-mentioned fifth optical pick-up of the present invention, it is preferable that when a distance between the center of the photo detecting portion PD0 and the light emitting spot of the first semiconductor laser light source is d1, a distance between the center of the photo detecting portion PD0 and the light emitting spot of the second semiconductor laser light source is d2, and a distance between the light emitting spots of the first and second semiconductor laser light sources is d12, a distance between the center of the photo detecting portion PD1 and the light emitting spot of the first semiconductor laser light source is d1, and a distance between the center of the photo detecting portion PD2 and the light emitting spot of the second semiconductor laser light source is d2, and the following relationship is substantially satisfied:

$$\lambda 1/\lambda 2 = d1/d2,$$

further the following relationship is substantially satisfied:

$$d2 = d1 + d12, \text{ and}$$

the following relationships are substantially satisfied:

$$d1 = \lambda 1 \cdot d12/(\lambda 2 - \lambda 1)$$

$$d2 = \lambda 2 \cdot d12/(\lambda 2 - \lambda 1).$$

According to such an optical pick-up, the photo detecting portion can be shared by wavelengths, and the number of the photo detecting portions can be reduced. Furthermore, if the wavelength $\lambda 1$ is shorter than the wavelength $\lambda 2$, when the first semiconductor laser light source, the second semiconductor laser light source, the photo detecting portion PD1, the photo detecting portion PD2 are arranged in this order in the direction perpendicular to the optical axis, the length of the photo detecting portion can be secured while reducing d1, thus enabling the cost reduction and the miniaturization of the apparatus to be realized.

Furthermore, it is preferable that the photo detecting portion PD1, the photo detecting portion PD2 and the photo detecting portion PD0 are divided into a plurality of regions respectively, and when information reproduction is carried out by using the light with wavelength $\lambda 1$, signals obtained from the regions of the photo detecting portion PD1 are calculated to detect a focus error signal; when information reproduction is carried out by using the light with wavelength $\lambda 2$, signals obtained from the region of the photo detecting portion PD2 are calculated to detect a focus error signal; and signals obtained from the regions of the photo detecting portion PD0 are calculated to detect a tracking error signal.

According to such an optical pick-up, since the focus error signals are detected in the photo detecting portion corresponding to each wavelength, it is possible to prevent the deterioration of the focus error signal property. In addition, since there is a photo detecting portion PD0 for detecting a specific tracking error signal in a plurality of regions, it is possible to employ three kinds of TE signals detecting methods, i.e., the phase difference method, the PP method, and the 3-beam method.

Furthermore, it is preferable that the photo detecting portion PD1, and the photo detecting portion PD2 are divided into a plurality of regions respectively, and when information reproduction is carried out by using the light with wavelength $\lambda 1$, signals obtained from the regions of the photo detecting portion PD1 are calculated to detect a focus error signal; and when information reproduction is carried out by using the light with wavelength $\lambda 2$, signals obtained from the regions of the photo detecting portion PD2 are calculated to detect a focus error signal, and wherein the shape of the photo detecting portion PD1 is different from the photo detecting portion PD2. According to such an optical pick-up, even if information is recorded/reproduced on an optical disk having a different base material thickness, the offset of the focus error signal can be prevented.

Furthermore, it is preferable that the photo detecting portion PD1 and the photo detecting portion PD2 are divided into a plurality of regions by dividing lines respectively and when information reproduction is carried out by using the light with wavelength λ1, signals obtained from the regions of the photo detecting portion PD1 are calculated to detect a focus error signal; and when information reproduction is carried out by using the light with wavelength λ2, signals obtained from the regions of the photo detecting portion PD2 are calculated to detect a focus error signal and, wherein a symmetrical central line parallel to the dividing line of the photo detecting portion PD2 and a symmetrical central line parallel to the dividing line of the photo detecting portion PD1 are deviated from each other in the direction perpendicular to each symmetrical central line. According to such an optical pick-up, even if information is recorded/reproduced on an optical disk having a different base material thickness, the offset of the focus error signal can be prevented.

A sixth optical pick-up of the present invention includes a first semiconductor laser light source for emitting a light beam with wavelength λ1; a second semiconductor laser light source for emitting a light beam with wavelength λ2; a converging optical system for receiving the light beams emitted from the first and second semiconductor laser light sources and for converging the received light beam into a microscopic spot on an optical disk; a diffractive element for diffracting the light beam reflected by the optical disk; and a photo detecting portion for receiving the diffracted light diffracted by the diffractive element and for outputting an electric signal proportional to the amount of the diffracted light, wherein the photo detecting portion includes a photo detecting portion PD1 for receiving the light beam with wavelength λ1 in the diffracted light diffracted by the diffractive element; a photo detecting portion PD2 for receiving the light beam with wavelength λ2, and a photo detecting portion PD0 for receiving the light beams with wavelength λ1 and wavelength λ2; and wherein when information reproduction is carried out by using the light with wavelength λ1, signals obtained from the regions of the photo detecting portion PD1 are calculated to detect a focus error signal; when information reproduction is carried out by using the light with wavelength λ2, signals obtained from the regions of the photo detecting portion PD2 are calculated to detect a focus error signal; and signals obtained from the regions of the photo detecting portion PD0 are calculated to detect a tracking error signal.

According to the first to sixth optical pick-ups, it is preferable that the first semiconductor laser light source and the second semiconductor laser light source are formed monolithically on one semiconductor chip. With such an optical pick-up, it is possible to reduce the manhours for assembling steps or to determine a distance between two light emitting points exactly.

Furthermore, it is preferable that the optical pick-up includes a grating that forms a main beam and a sub-beam that is ±first order diffracted lights by receiving a light beam with wavelength λ2 emitted from the second semiconductor laser light source when the wavelength λ1 is set to be in the range from 610 nm to 670 nm, and the wavelength λ2 is set to be in the range from 740 nm to 830 nm, wherein a grating cross-sectional shape of the grating is substantially rectangular having concave and convex portions, the width of the concave portion and the width of the convex portion are substantially the same, and a level difference h between the concave portion and the convex portion of the cross sectional shape is represented by the following relationship when n1 denotes a refractive index of a material of the grating with respect to the wavelength λ1:

$$h = \lambda 1/(n1-1), \text{ and}$$

the level difference in an optical path between the concave portion and the convex portion is set to be one wavelength. According to the above-mentioned optical pick-up, the phase difference due to the difference of the optical path becomes 2 π, and in design, the optical beam with wavelength λ1 is not diffracted by the grating, it is possible to light efficiently without loss of light amount. Furthermore, in the case of the light beam with wavelength λ2, the wavelength is longer than wavelength λ1, the optical path difference in optical path generated due to the level difference h is smaller than one wavelength, and the phase difference also becomes smaller than 2 π. Consequently, the diffraction occurs, and the sub-spot can be produced.

Furthermore, it is preferable that in both of the light beam with wavelength λ1 and the light beam with wavelength λ2, a light beam entering an objective lens constituting the converging optical system without being diffracted by the grating, forms grating stripes in the entire range satisfying the NA necessary to the reproduction of the optical disk.

Furthermore, it is preferable that the wavelength λ1 is smaller than the wavelength λ2, and the light emitting spot of the first semiconductor laser light source is arranged substantially on the optical axis of the converging optical system. With such an optical pick-up, since a laser light beam from the short wavelength laser element that is susceptible to the lens aberration passes through the vicinity of the optical axis of the converging system having a small lens aberration, it is possible to prevent the off-axis aberration from occurring.

Furthermore, it is preferable that the diffractive element has a focus error offset reducing region. With such an optical pick-up, it is possible to suppress the focus offset, and thus to realize a stable and accurate focus servo operation. Furthermore, the diffractive means is provided with a plurality of focus error offset reducing areas corresponding to the light beam with wavelengths λ1 and λ2, and it is possible to suppress the focus error offset when light beams with wavelengths λ1 and λ2 are emitted.

Next, the optical disk apparatus of the present invention includes an optical pick-up according to any of the above-mentioned first to sixth optical pick-ups and a moving mechanism for optical pick-up, and a rotation mechanism for rotating the optical disk.

Next, the optical disk type recognition of the present invention is a method for determining whether an optical disk is present in the optical disk apparatus, and determining whether a disk that is present is CD or DVD, the method and includes, by using the optical disk apparatus provided with an optical pick-up using an infrared light source and a red light source, determining whether an optical disk apparatus is present by emitting the infrared light source first when the power of the optical disk apparatus is turned on or when an optical disk is inserted into the apparatus, and determining the kind of the optical disk by using the reflected light from the optical disk when the optical disk is present. According to the above-mentioned optical disk type recognition method, even if the inserted optical disk is an optical disk for infrared light, for example CD-R, unnecessary writing of information or wrong erasing of necessary information can be prevented.

Next, an optical disk recording and reproducing method of the present invention includes: recording or reproducing information by continuing to allow the infrared light to be emitted when the inserted optical disk is judged to be CD by the determination of the optical disk by the above-mentioned optical disk type recognition method of the present invention, and recording or reproducing information on DVD by extinguishing the infrared light and turning on the red light when the inserted disk is judged to be DVD by the determination of the optical disk.

Next, the information processing apparatus of the present invention includes: an optical disk apparatus for recording or reproducing information on an optical disk, or for reproducing and for reproducing information on an optical disk, and an image information read-out means for reading out an image information on a manuscript, wherein the image information read out by the information read-out means can be recorded on the optical disk apparatus.

It is preferable that the above-mentioned information processing apparatus further includes an information copying means capable of at least one of copying of image information read out by the image reading means by the use of the copying means, and copying of the image information recorded on the optical disk apparatus by the use of the copying means.

Next, the image projection apparatus includes a projecting means for projecting an image onto a front glass of a car.

Furthermore, it is preferable that the above-mentioned image projection apparatus further includes an optical disk apparatus for recording or reproducing information on the optical disk, or an optical disk apparatus for recording and reproducing information, wherein the information reproduced from the optical disk apparatus is projected onto the front glass.

Furthermore, it is preferable that the above-mentioned image projection apparatus further includes a converting circuit for converting the information reproduced by the optical disk apparatus into an image adjusted to the curvature of the front glass, wherein the information output from the converting circuit is projected onto the front glass. According to the above-mentioned image projection apparatus, it is possible to prevent the distortion of the image due to the curvature or the front glass.

Next, a first semiconductor laser apparatus of the present invention includes a first semiconductor laser light source for emitting a light beam with wavelength $\lambda 1$; a second semiconductor laser light source for emitting a light beam with wavelength $\lambda 2$; and a photo detecting portion for receiving the light beam and for outputting a signal proportional to the amount of the diffracted light, wherein a distance d1 between the center of the photo detecting portion PD0 and the light emitting spot of the first semiconductor laser light source and a distance d2 between the center of the photo detecting portion PD0 and the light emitting spot of the second semiconductor laser light source substantially satisfy the following relationship:

$$\lambda 1/\lambda 2 = d1/d2.$$

According to the above-mentioned first semiconductor laser apparatus, the photo detecting portion can be shared by both wavelengths, and the number of the photo detecting portions can be reduced. Therefore, it is possible to reduce the area of the photodetector and the number of the circuit elements converting output signals into current/voltage signals, thus enabling the cost reduction and the miniaturization of the apparatus to be realized.

A second semiconductor laser apparatus of the present invention includes a first semiconductor laser light source for emitting a light beam with wavelength $\lambda 1$; a second semiconductor laser light source for emitting a light beam with wavelength $\lambda 2$; and a photo detecting portion for receiving the diffracted light diffracted by the diffractive element and for outputting a signal proportional to the amount of the diffracted light, wherein a distance d1 between the center of the photo detecting portion PD0 and the light emitting spot of the first semiconductor laser light source, a distance d2 between the center of the photo detecting portion PD0 and the light emitting spot of the second semiconductor laser light source, and the distance d12 between the light emitting spots of the first and second semiconductor laser light sources satisfy the following relationship:

$$d2 = d1 + d12$$

and substantially satisfy the following relationships:

$$d1 = \lambda 1 \cdot d12/(\lambda 2 - \lambda 1)$$

$$d2 = \lambda 2 \cdot d12/(\lambda 2 - \lambda 1).$$

According to the above-mentioned second optical pickup, with respect to the predetermined distance between light emitting spots, the photo detecting portion can be shared by both wavelengths, and the number of the photo detecting portions can be reduced. Therefore, it is possible to reduce the area of the photodetector and the number of the circuit elements converting output signals into current/voltage signals, thus enabling the cost reduction and the miniaturization of the apparatus to be realized.

In the first or second semiconductor laser apparatus of the present invention, it is preferable that the photo detecting portion includes a photo detecting portion PD1 for receiving light with wavelength $\lambda 1$ and a photo detecting portion PD2 for receiving light with wavelength $\lambda 2$, and the photo detecting portion PD1 and the photo detecting portion PD2 are divided into a plurality of regions and the shape of the photo detecting portion PD1 is different from the shape of the photo detecting portion PD2. According to the above-mentioned semiconductor laser apparatus, even if information is recorded/reproduced on an optical disk having a different base material thickness, the offset of the focus error signal can be prevented.

Furthermore, it is preferable that the photo detecting portion includes a photo detecting portion PD1 for receiving the light with wavelength $\lambda 1$ and a photo detecting portion PD2 for receiving the light with $\lambda 2$, and wherein the photo detecting portion PD1 and the photo detecting portion PD2 are divided into a plurality of regions by dividing lines, and a symmetrical central line parallel to the dividing line of the photo detecting portion PD2 and a symmetrical central line parallel to the dividing line of the photo detecting portion PD1 are deviated from each other in the direction perpendicular to each symmetrical central line. According to the above-mentioned semiconductor laser apparatus, even if information is recorded/reproduced on an optical disk having a different base material thickness, the offset of the focus error signal can be prevented.

A third semiconductor laser apparatus of the present invention includes a first semiconductor laser light source for emitting a light beam with wavelength $\lambda 1$; a second semiconductor laser light source for emitting a light beam with wavelength $\lambda 2$; and a photo detecting portion for receiving the diffracted light diffracted by the diffractive element and for outputting a signal proportional to the amount of the diffracted light, wherein the photo detecting portion includes a photo detecting portion PD1 for receiving a light beam with wavelength λ1, and a photo detecting portion PD2 for receiving a light beam with wavelength λ2; and a distance d1 between the center of the photo detecting portion PD1 and the light emitting spot of the first semiconductor laser light source and a distance d2 between the center of the photo detecting portion PD2 and the light emitting spot of the second semiconductor laser light source substantially satisfy the following relationship:

$$\lambda 1/\lambda 2 = d1/d2.$$

According to the above-mentioned third semiconductor laser apparatus, since there are photo detecting portions PD1 and PD2 each corresponding to respective wavelength of the light sources, the photo detecting portions PD1 and PD2 can be used for the photodetecting portions for detecting focus error signals of the different kinds of optical disk each corresponding to a respective wavelength.

In the third semiconductor laser apparatus of the present invention, it is preferable that at least one of the photo detecting portion PD1 and the photo detecting portion PD2 is divided into any one of a five strip-shaped regions, four strip-shaped regions and six strip-shaped regions. According to such a semiconductor laser apparatus, the diffracted light in the dividing regions can be separated appropriately, and thus each diffracted light that is conjugated with respect to the above-mentioned diffracted light also can be separated appropriately. Therefore, in the photo detecting portion, each diffracted light is secured to be separated to detect signals, thus enabling TE signals to be obtained by a more excellent phase difference method.

A fourth semiconductor laser apparatus of the present invention includes a first semiconductor laser light source for emitting a light beam with wavelength λ1; a second semiconductor laser light source for emitting a light beam with wavelength λ2; and a photo detecting portion for receiving the diffracted light diffracted by the diffractive element and for outputting an electric signal proportional to the amount of the diffracted light, wherein the photo detecting portion includes a photo detecting portion PD1 for receiving a light beam with wavelength λ1, a photo detecting portion PD2 for receiving a light beam with wavelength λ2; and a photo detecting portion PD0 for receiving both lights with wavelength λ1 and wavelength λ2, wherein when a distance between the center of the photo detecting portion PD0 and the light emitting spot of the first semiconductor laser light source is d1, a distance between the center of the photo detecting portion PD0 and the light emitting spot of the second semiconductor laser light source is d2, and a distance between the light emitting spots of the first and second semiconductor laser light sources is d12, a distance between the center of the photo detecting portion PD1 and the light emitting spot of the first semiconductor laser light source is d1, and a distance between the center of the photo detecting portion PD2 and the light emitting spot of the second semiconductor laser light source is d2, the following relationship is substantially satisfied:

$$\lambda 1/\lambda 2 = d1/d2,$$

further the following relationship is substantially satisfied:

$$d2 = d1 + d12, \text{ and}$$

the following relationships are substantially satisfied:

$$d1 = \lambda 1 \cdot d12/(\lambda 2 - \lambda 1)$$

$$d2 = \lambda 2 \cdot d12/(\lambda 2 - \lambda 1).$$

According to such a semiconductor laser apparatus, the photo detecting portion can commonly be used for both wavelengths, and the number of the photo detecting portions can be reduced. Furthermore, when the wavelength λ1 is shorter than the wavelength λ2, when the first semiconductor laser light source, the second semiconductor laser light source, the photo detecting portion PD1, the photo detecting portion PD2 are arranged in this order in the direction perpendicular to the optical axis, the length of the photo detecting portion can be secured while reducing d1, thus enabling the cost reduction and the miniaturization of the apparatus to be realized.

In the first and second semiconductor laser apparatus, it is preferable that the photo detecting portion PD1 and the photo detecting portion PD2 are divided into a plurality of regions respectively, and the shape of the photo detecting portion PD1 is different from the shape of the photo detecting portion PD2. According to the semiconductor laser apparatus, even if information is recorded/reproduced on an optical disk having a different base material thickness, the offset of the focus error signal can be prevented.

Furthermore, it is preferable that the photo detecting portion PD1 and the photo detecting portion PD2 are divided into a plurality of regions by a dividing line, and a symmetrical central line parallel to the dividing line of the photo detecting portion PD2 and a symmetrical central line parallel to the dividing line of the photo detecting portion PD1 are deviated from each other in the direction perpendicular to each symmetrical central line. According to the semiconductor laser apparatus, even if information is recorded/reproduced on an optical disk having a different base material thickness, the offset of the focus error signal can be prevented.

In the first to fourth semiconductor laser apparatus, it is preferable that the first semiconductor laser light source and the second semiconductor laser light source are formed monolithically on one semiconductor chip. According to the above-mentioned semiconductor laser apparatus, it is possible to reduce the manhour for assembling steps or to determine a distance between two light emitting points exactly.

DESCRIPTION OF THE PREFERRED EMBODIMENTS

Hereinafter, the present invention will be described by way of embodiments with reference to the accompanying drawings.

Embodiment 1

Figure 1:
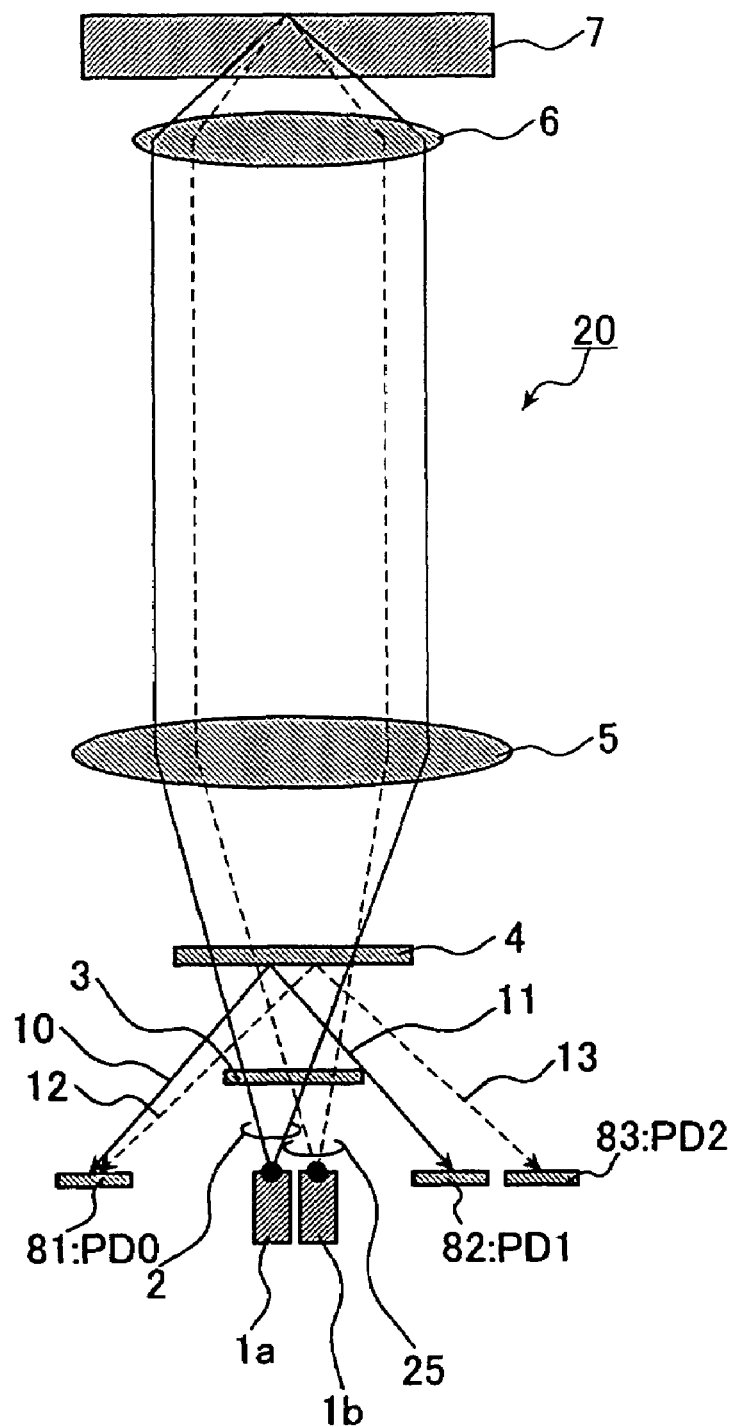
FIG. 1 is a schematic cross-sectional view showing an optical pick-up according to a first embodiment of the present invention.

FIG. 1 is a view showing a configuration of an optical pick-up according to a first embodiment of the present invention. In FIG. 1, a semiconductor laser light source includes a red laser 1a and an infrared laser 1b. Reference numerals 81, 82 and 83 denote optical detecting portions (PD0, PD1 and PD2) carrying out a photoelectric conversion, that is, receiving light beams and converting the received light beams into electric signals such as electric current. Reference numeral 3 denotes a grating; and 4 denotes a diffractive element, and as the diffractive element, an optical element in which a phase or a transmissivity having a periodical structure is used. In the diffractive element 4, the period or direction, that is, a grating vector, may vary depending on the parts. A typical example of the diffractive element is a hologram, for example, a phase-type hologram. In the explanation below, the diffractive element will be explained as taking a hologram 4 as an example. Reference numeral 5 denotes a collimating lens; 6 denotes an objective lens that constitutes a light converging system; and 7 denotes an optical disk.

Moreover, in the optical pick-up shown in this figure, a portion including the semiconductor laser light source and the photo detecting portion corresponds to the semiconductor laser apparatus. The same is true in the below mentioned embodiments.

As mentioned below, the optical disk 7 includes CD, CD-R or the like having a base material thickness t1 of about 1.2 mm and DVD (DVD-ROM, DVD-RAM, or the like) having a base material thickness t2 of about 0.6 mm. Herein, the base material thickness denotes a thickness between a surface where light beams output from the objective lens enters and an information recording surface. Hereinafter, an optical disk having a base material thickness of about 1.2 mm and having the same recording density as that of CD-ROM will be referred to as a CD optical disk, and an optical disk having a base material thickness of about 0.6 mm and having the same recording density as that of DVD-ROM will be referred to as a DVD optical disk.

As one example, separate semiconductor laser chips, that is, a red laser 1a and an infrared laser 1b, can be arranged in a form of hybrid. In this case, since each semiconductor laser chip can be made to be a minimum size and can be produced by respective optimum methods, it is possible to realize low noise, low consumption of electric current, and high durability property. As another example, a red laser 1a and an infrared laser 1b may be formed into one semiconductor laser chip monolithically. In this case, it is possible to reduce the man-hours for assembling steps or to determine a distance between two light emitting points exactly. These configurations can be applied for the following optical pick-ups and all the embodiments.

The photo detecting portions 81, 82, and 83 respectively correspond to PD0, PD1, and PD2, which are mentioned in SUMMARY OF THE INVENTION of this specification. The photo detecting portions 81, 82, and 83 are separated in FIG. 1. However, by forming them on a single silicon substrate, the relative positional relationship of them can be determined precisely.

Figure 2:
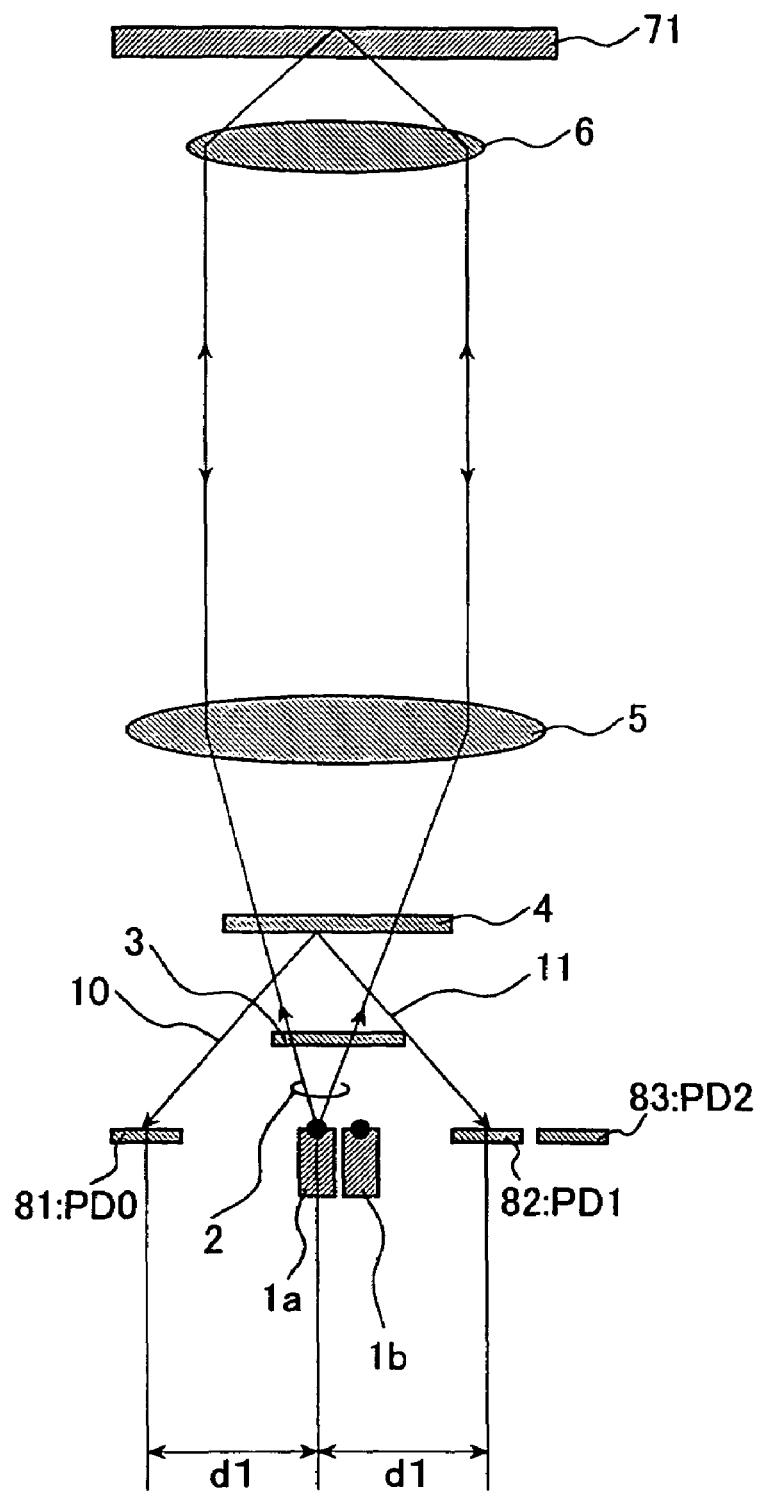
FIG. 2 is a schematic cross-sectional view showing an operation of the optical pick-up of FIG. 1.

An operation of recording or reproducing information on the optical disk will be described with reference to FIGS. 2 and 3. FIG. 2 is a view to explain an operation of recording or reproducing information on a DVD (DVD-ROM, DVD-RAM, etc) optical disk 71 having a base material thickness t2 of about 0.6 mm by using the red laser 1a.

The red light beam 2 emitted from a red laser 1a passes through a grating 3 and a hologram 4, and is collimated by a collimating lens 5 into a nearly parallel light beam, and converged onto an optical disk 71 by an objective lens 6. Furthermore, the red light beam 2 is diffracted and reflected by pits or track grooves formed on the information recording surface of the optical disk 71. Thereafter, the light beam returns on substantially the same optical path by way of the objective lens 6 and the collimating lens 5, and again enters the hologram 4 to generate a +first-order diffracted light 10 and a −first-order diffracted light 11.

The +first-order diffracted light 10 and the −first-order diffracted light 11 enter the photo detecting portion 81 and the photo detecting portion 82 respectively, and are photoelectrically converted. Herein, when the distance between the center of the photo detecting portion 81 and the light emitting spot of the red laser 1a is set to be d1, it is necessary that the distance between the center of the photo detecting portion 82 receiving −first-order diffracted light 11 that is conjugated with respect to the +first-order diffracted light 10 also should be set to be about d1.

Figure 3:
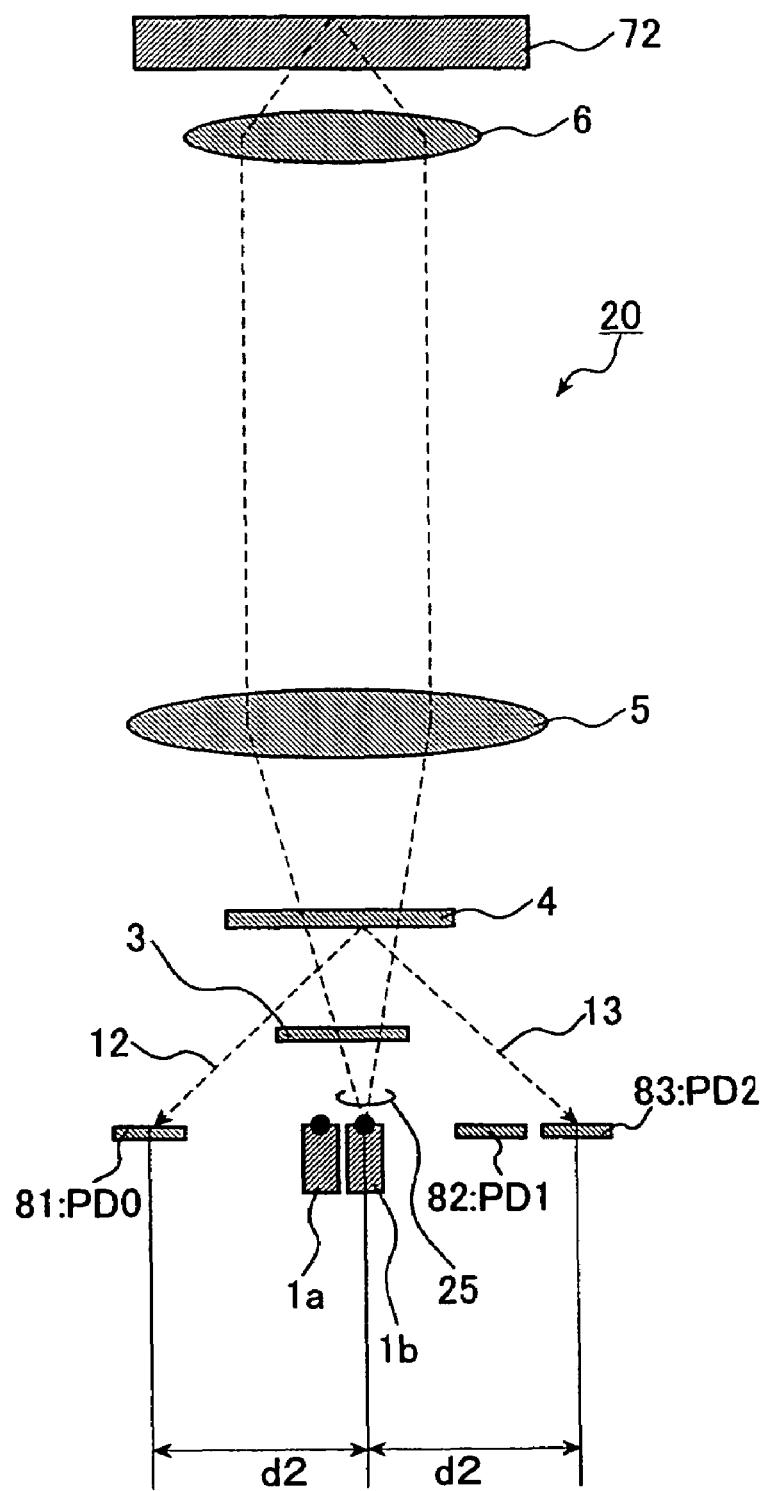
FIG. 3 is a schematic cross-sectional view showing an operation of the optical pick-up of FIG. 1.

FIG. 3 is a view to explain an operation of recording or reproducing information on a CD (CD-ROM, CD-R, etc.) optical disk 72 having a base material thickness t1 of about 1.2 mm by using the red laser 1b.

The infrared light beams 25 emitted from the infrared laser 1b are diffracted in transmitting the grating 3 to generate ±first-order sub-spots, pass through the hologram 4 together with a zero-order diffracted light (main spot), are collimated by a collimating lens 5 into nearly parallel light beams, and converged onto an optical disk 71 by an objective lens 6. Furthermore, the infrared light beams 25 are diffracted and reflected by pits or track grooves formed on the information recording surface of the optical disk 71. Thereafter, the light beam returns on substantially the same optical path by way of the objective lens 6 and the collimating lens 5, and enters the hologram 4 to generate a +first-order diffracted light 12 and a −first-order diffracted light 13. The +first-order diffracted light 12 and −first-order diffracted light 13 enter the photo detecting portion 81 and the photo detecting portion 83 respectively, and are converted photoelectrically.

Herein, when the distance between the center of the photo detecting portion 81 and the light emitting spot of the red laser 1b is set to be d2, it is necessary that the distance between the center of the photo detecting portion 83 receiving −first-order diffracted light 13 that is conjugated with respect to the +first-order diffracted light 12 also should be set to be about d2.

Figure 4:
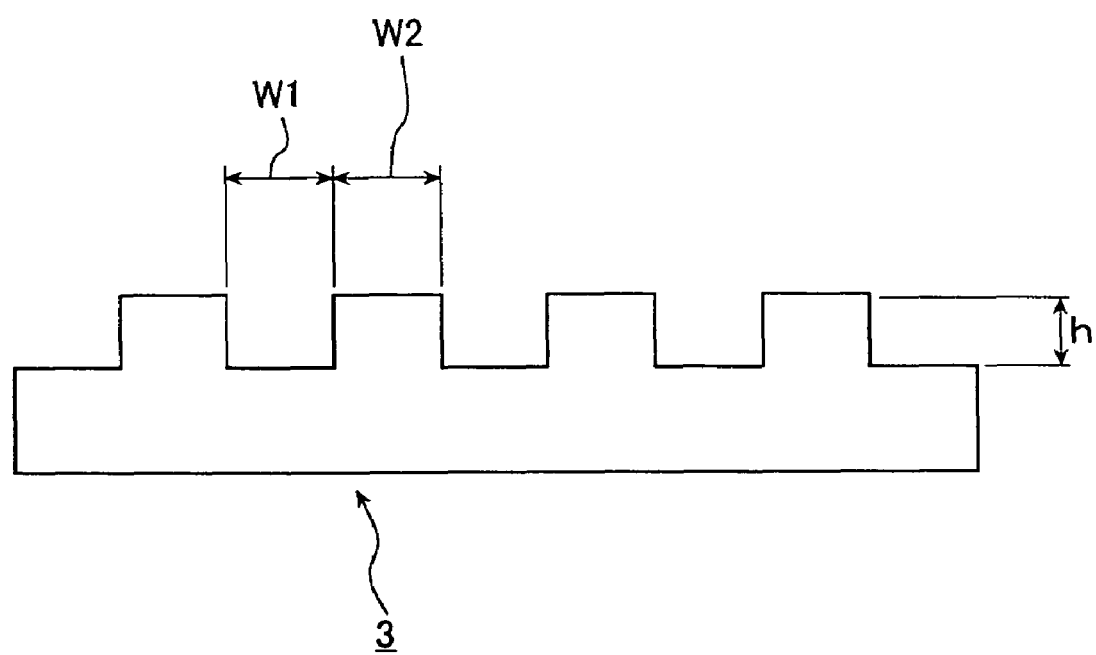
FIG. 4 is a cross-sectional view showing a grating used for the optical pick-up of FIG. 1.

FIG. 4 is a view showing a grating cross-sectional shape of the diffraction gating 3. The grating cross-sectional shape of the grating 3 is substantially a rectangular shape, and the width W1 of the concave portions and the width W2 of the convex portions have substantially the same width. The level difference h between the concave portion and the convex portion of the cross sectional shape of the grating is represented by the following relationship (1) when λ1 denotes a wavelength of the red light beam 2, and n1 denotes a refractive index of a material of the grating with respect to the wavelength λ1:

$$h = \lambda 1/(n1-1) \tag{1}$$

Herein, the difference in an optical path between the concave portion and the convex portion is set to correspond to one wavelength with respect to the red light beam. By doing so, a phase difference due to the difference of the optical path becomes 2π. Thus, in design, the red light is not diffracted by the grating 3 and uses light efficiently without the loss of the light amount. Furthermore, since the wavelength of the infrared light is longer than that of the red light, the difference in the optical path generated due to the level difference h is smaller than one wavelength and also the phase difference is smaller than 2π and diffraction occurs, thus enabling sub-spots to be generated as mentioned above.

Moreover, reproducing information on a CD optical disk by using an infrared light beam requires the NA of 0.45 or more. It is necessary to form grating stripes in the sufficiently broad range of the grating 3 so that the diffracted light beams are generated from the entire range in which the NA of the sub-beam becomes 0.45 at the objective lens 6.

Furthermore, it is desirable in design that the red light beam 2 is not diffracted as mentioned above. It is thought that the diffraction somewhat occurs due to the manufacturing error. When a part of the red light beam 2 transmits a portion of the grating 3 not including grating stripes and enters the objective lens 5, the inconsistency of strength and phase (difference depending on places) occurs between the part of the red light beam 2 passing through the portion without including grating stripes of the grating 3 and entering the objective lens 5 and the red light beam 2 passing through the grating stripes, which may lead to deterioration in the performance of converging light beams onto the recording surface of the optical disk 71. Therefore, it is desirable that the grating stripes are formed on the entire range in which the light beam entering the objective lens without being diffracted by the grating 3 satisfies the NA (0.6) that is necessary to the information reproduction on a DVD optical disk.

However, when the diffracted light 12 or diffracted light 13, which is reflected by and returned from a CD optical disk 72, enters the hologram 4 and diffracted, enters the diffracted stripes, the light is diffracted further, thus causing the loss of the amount of light. In order to avoid the loss of the light amount, it is necessary to limit the range of the grating stripes on the grating 3.

For example, by forming grating stripes in the portion shown by the grating 3 in FIG. 1, the converging spot performance can be secured when information reproduction is carried out on a DVD optical disk. Furthermore, the loss of the light amount can be prevented when reproducing information on the CD optical disk.. The grating 3 includes grating stripes, and has a transparent substrate (not shown in figure) in the broader range, and the diffracted light 12 or diffracted light 13 passes through the transparent portion (on which the grating stripes are not formed).

Furthermore, a DVD optical disk is a higher density optical disk compared with a CD optical disk. The DVD disk is required to reproduce (or record) information with a converging spot having less aberration than that of the CD optical disk. Therefore, it is desirable that the light emitting spot of the red laser 1a is arranged on the optical axis (in this embodiment, an optical axis of the collimating lens 5) of the light converging system within the range of the assemble tolerance. Thereby, the laser light from short wavelength laser apparatus, which is easily affected by lens aberration, passes in the vicinity of the optical axis of the collimating lens 5 having a small lens aberration. Therefore, off-axis aberration does not occur when information reproduction is carried out on the DVD optical disk. Thus, it is possible to reproduce (or to record) information on the DVD optical disk stably and with higher density.

Furthermore, the relationship between the distance d1 from the center of the photo detecting portion 81 to the light emitting spot of the red laser 1a and the distance d2 from the center of the photo detecting portion 81 to the light emitting spot of the infrared laser 1b and the wavelength is described. Since the diffracting distance is substantially proportional to the wavelength, arranging is carried out so that the relationships (2) and (2)′ are satisfied:

$$d1:d2 = \lambda 1:\lambda 2 \tag{2},$$

that is, $$d1/d2 = \lambda 1/\lambda 2 \tag{2)'}$$

in the above-mentioned relationship, λ1 denotes a wavelength of the red laser and λ2 denotes a wavelength of the infrared laser. Thus, the photo detecting portion 81 can be used in both wavelengths and the number of the photo detecting portions can be reduced. Therefore, it is possible to reduce the area of the photodetector and the number of the circuit elements converting an output into current/voltage signals. Consequently, it is possible to realize the cost reduction and the miniaturization of the apparatus.

As is apparent from FIGS. 2 and 3, when the distance between the light emitting spot of the red laser 1a and the light emitting spot of the infrared laser 1b is d12, the following relationship is satisfied:

$$d2 = d1 + d12 \tag{3}$$

from the relationships (2) and (3), the following relationships (4) and (5) are satisfied:

$$d1 = \lambda 1 \cdot d12/(\lambda 2 - \lambda 1) \tag{4}$$

$$d2 = \lambda 2 \cdot d12/(\lambda 2 - \lambda 1) \tag{5}$$

By using this arrangement, since the photo detecting portion 81 commonly can be used for both wavelengths, and the number of the photo detecting portions can be reduced, it is possible to reduce the area of the photodetector and the number of the circuit elements converting output signals into current/voltage signals, thus enabling the cost reduction and the miniaturization of the apparatus to be realized.

Herein, the photo detecting portions 82 and 83 that are provided electrically separated from the two laser light sources 1a and 1b are arranged so that the order from the left side in FIG. 2 becomes a red laser 1a, an infrared laser 1b, a photo detecting portion 82 corresponding to the red laser, and a photo detecting portion 83 corresponding to the infrared laser. This arrangement can exhibit the following effect: when d12 is, for example, about 100 μm to 120 μm and d1 is about 500 μm, the length of the photo detecting portions 83 and 83 in the left-to-right direction in FIG. 2 can be secured to be 50 82 m or more, and the photodetector can be miniaturized. On the other hand, in the configuration disclosed in JP1998-124918A, the order of the photo detecting portions 82 and 83 is reversed. Therefore, unless d1 is 1 mm or more, the length of the photo detecting portion cannot be secured to be 50 μm or more. As a result, the size of the entire photo detecting portion becomes larger, and cannot be miniaturized. In other words, the effect of miniaturizing the photo detecting portion of the present invention cannot be achieved.

In the above-mentioned relationships (2'), (4) and (5), both sides of the equation representing relationship are substantially the same. In other words, not only the case where values of both sides are completely equal, but also the case where the values of the both sides are substantially equal to the extent that the effect obtained by the fact that the relationship equations are achieved without practical problems.

Second Embodiment

Figure 5:
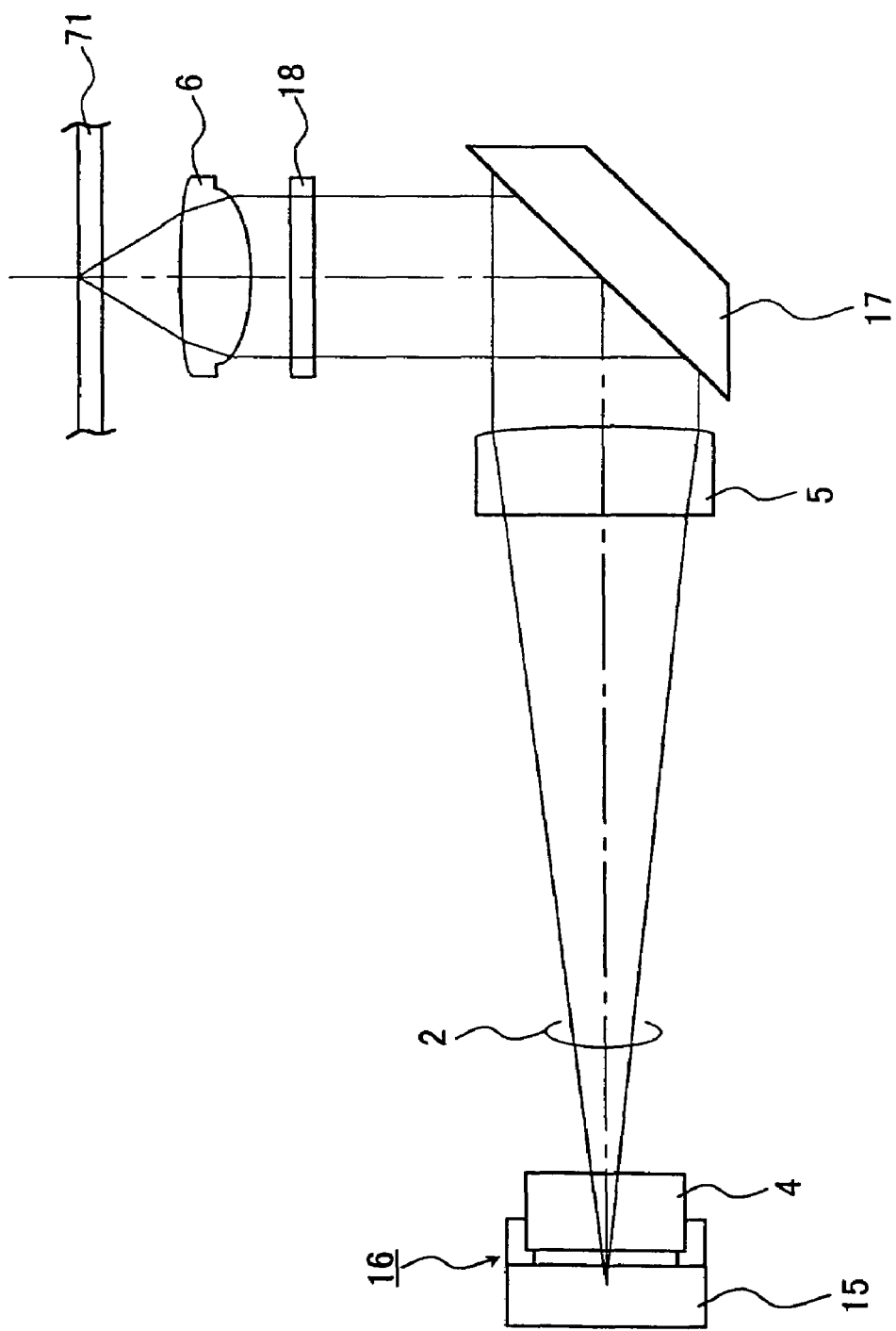
FIG. 5 is a schematic cross-sectional view showing an operation of an optical pick-up according to a second embodiment of the present invention.
Figure 6:
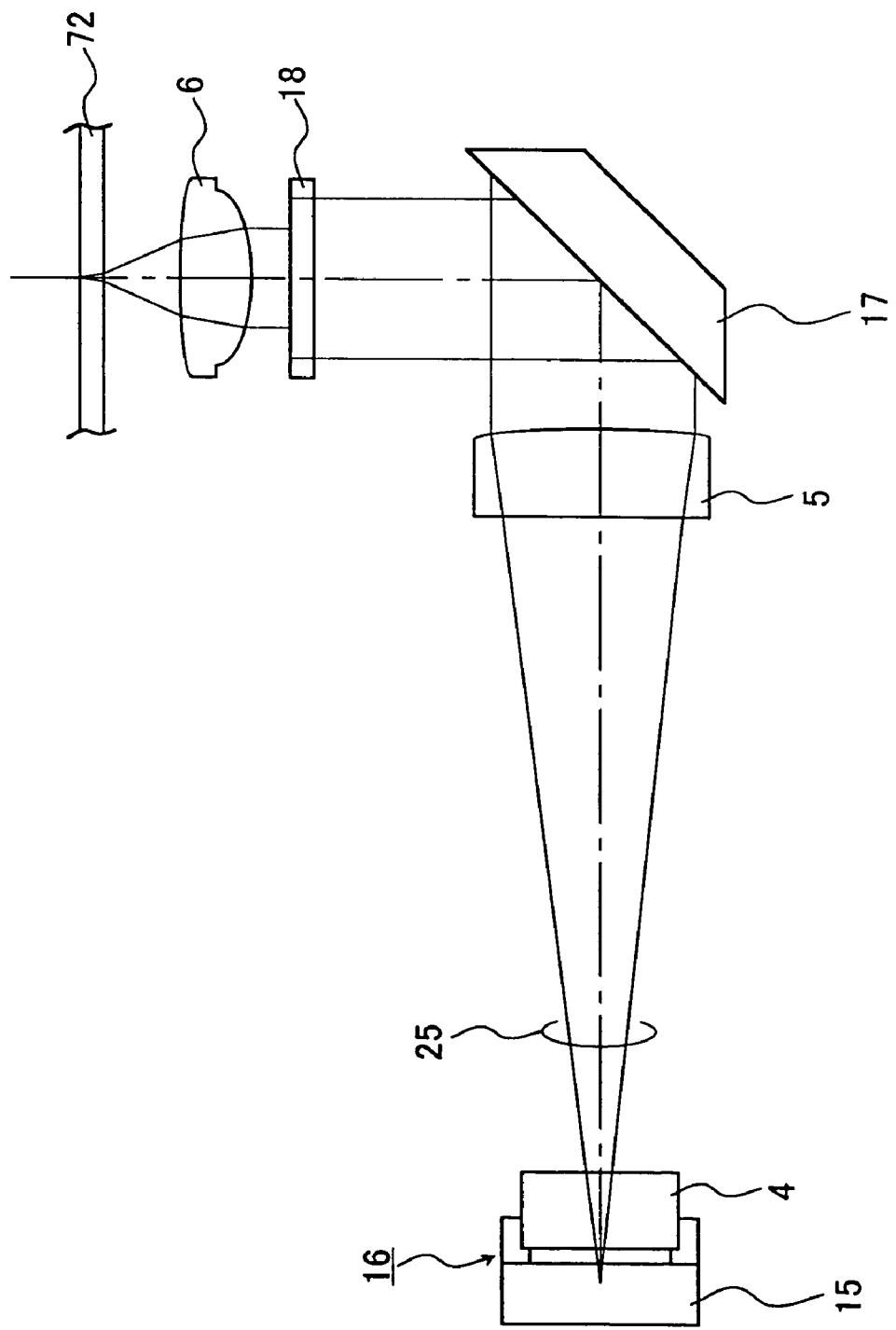
FIG. 6 is a schematic cross-sectional view showing an operation of an optical pick-up according to a second embodiment of the present invention.

FIGS. 5 and 6 show a configuration of a thin optical pick-up by using a rising mirror of the second embodiment. FIG. 5 shows a case where information is reproduced on a DVD optical disk by using an emitted red light beam 2. FIG. 6 shows a case where information is reproduced on a DVD optical disk by using an emitted infrared light beam 25.

The light collimated by the collimating lens 5 into nearly parallel beam of light is reflected by the rising mirror 17 and changes the direction of moving, thereby reducing the size (thickness) of the optical pick-up in the direction perpendicular to the plane of the optical disk 7.

As shown in FIG. 5, a wavelength selection aperture 18 just serves as a transparent substrate with respect to the red light beam 2 and does not act on it. As shown in FIG. 6, the wavelength selection aperture 18 shields light beams distant from the optical axis with respect to the infrared light beam 25. This wavelength selection aperture 18 can be formed by forming dielectric multi-layered films having different wavelength properties in the vicinity of the optical axis and on the outer peripheral portion distant from the optical axis, or by forming a phase grating having different phase modulation amounts. Since the DVD optical disk has higher recording density, information reproduction requires a larger NA as compared with a CD optical disk. Therefore, by using the means for changing the NA in accordance with the wavelength, NA is set to be a necessary minimum when reproducing information on a CD optical disk while reducing the aberration due to the thickness of the base material or the inclination of disk.

In FIGS. 5 and 6, reference numeral 15 denotes a package. The package 15 includes, as shown in FIG. 1, at least a red laser 1a and an infrared laser 1b and photodetector in which photo detecting portions 81-83 are formed. One component in which a light source and photodetector are integrated into one piece will be referred to as a unit in the following. The hologram 4 may be formed near the collimating lens 5. However, by integrating also the hologram 4 into the unit 16, it is possible to fix the components necessary to produce servo signals closely to each other. Therefore, it is possible to detect servo control signals stably, which are not susceptible to a distortion due to a change in temperature.

Moreover, the hologram 4 may be fixed to the objective lens 6 and driven together. When reproducing information on DVD-RAM, diffracted light output from the hologram 4 is received at the dividing region of the photodetector, the differential calculation of the output signal is carried out, and a tracking error (TE) signal is obtained by the push-pull (PP) method. At this time, when a far-field pattern (FFP) moves with respect to the hologram 4 due to the movement of the objective lens 6, a TE signal offset occurs. However, if the objective lens 6 and the hologram 4 are driven together, even if the objective lens 6 moves, the relative positional relationship between the FFP that transmits the objective lens 6 and hologram 4 is constant. Therefore, it is possible to solve such an element of uncertainty as an occurrence of TE offset.

Third Embodiment

Figure 7:
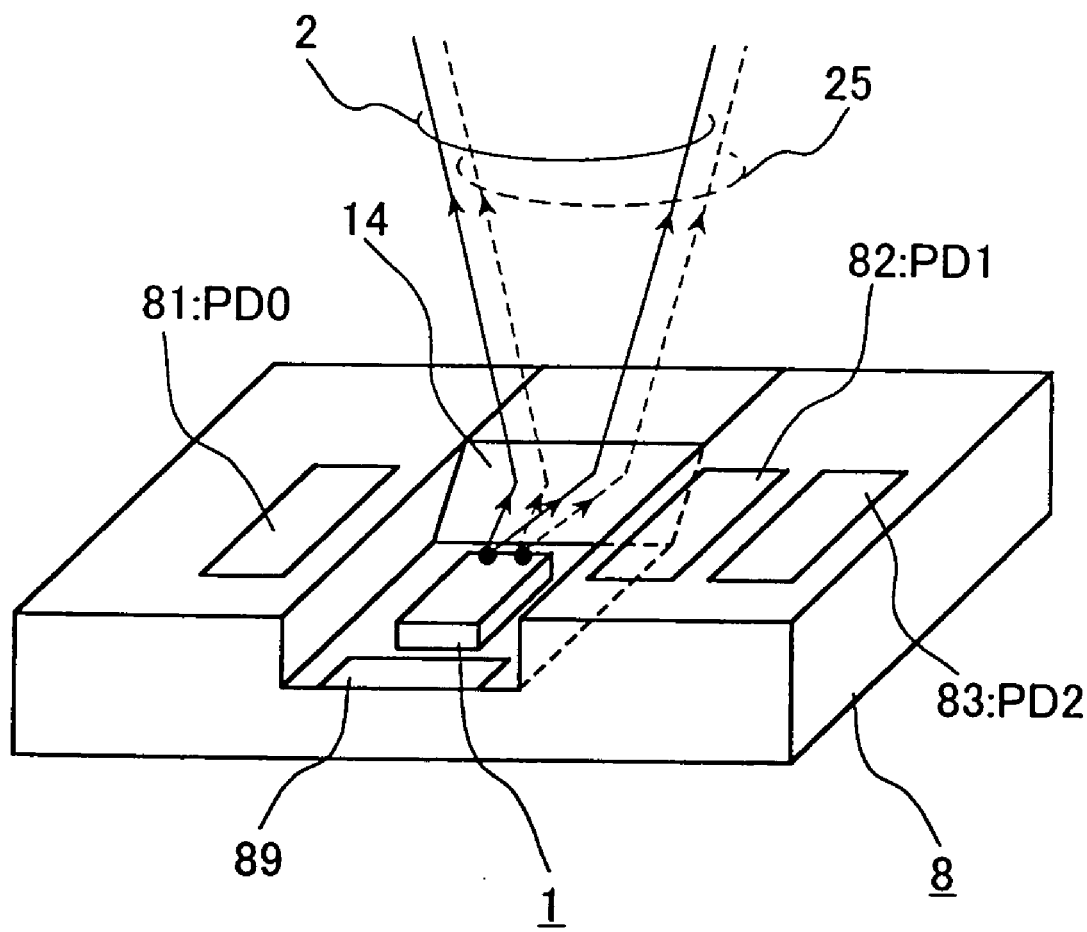
FIG. 7 is a schematic perspective view showing a photodetector according to a third embodiment of the present invention.
Figure 7:
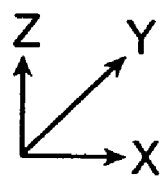

FIG. 7 shows a photodetector 8 according to a third embodiment. The photodetector 8 has a configuration in which the red laser 1a and the infrared laser 1b, and the photo detecting portions 81 to 83 are integrated. The photodetector 8 includes photo detecting portions 81 to 83 formed on a silicone substrate, etc. By integrating all of the photo detecting portions on one substrate like this, it is possible to reduce the manhours for electrical connection and to determine the relative positions between the photodetectors with high precision. Reference numeral 1 denotes a laser light source such as a semiconductor laser in which a red laser and an infrared laser are integrated monolithically. By forming lasers having two different wavelengths on one chip of the semiconductor laser light source 1 like this, the distance between the light emitting spot of the red laser and the light emitting spot of the infrared laser can be set precisely in a μm order or sub μm order. Therefore, the detecting signal using lights of both wavelengths exhibits excellent properties.

A small reflecting mirror 14 is provided in the direction in which the red light beam 2 or the infrared light beam 25 is emitted from the laser source 1. The mirror 14 allows the optical axis of the red light beam 2 or the infrared light beam 25 to be bent into the direction perpendicular to the surface made by the photo detecting portions 81 to 83. This mirror 14 can be formed by anisotropic etching of the silicon of the substrate, or adhering the small size prism mirror to the photodetector 8. By providing a photo detecting portion 89 also on the side opposite to the mirror 14 with respect to the laser light source 1, the amount of light emitted from the laser light source 1 in the direction of the photo detecting portion 89 can be detected, and the detected signals at the photo detecting portion 89 can be utilized for the signal for controlling the amount of light.

Next, detailed configurations of the photo detecting portions 81 to 83 and the hologram 4 will be explained with reference to FIGS. 8, 9, and 10. The entire configuration of the optical pick-up is the same as in FIG. 1 and the basic operation thereof is the same as in FIGS. 2 and 3.

Figure 8:
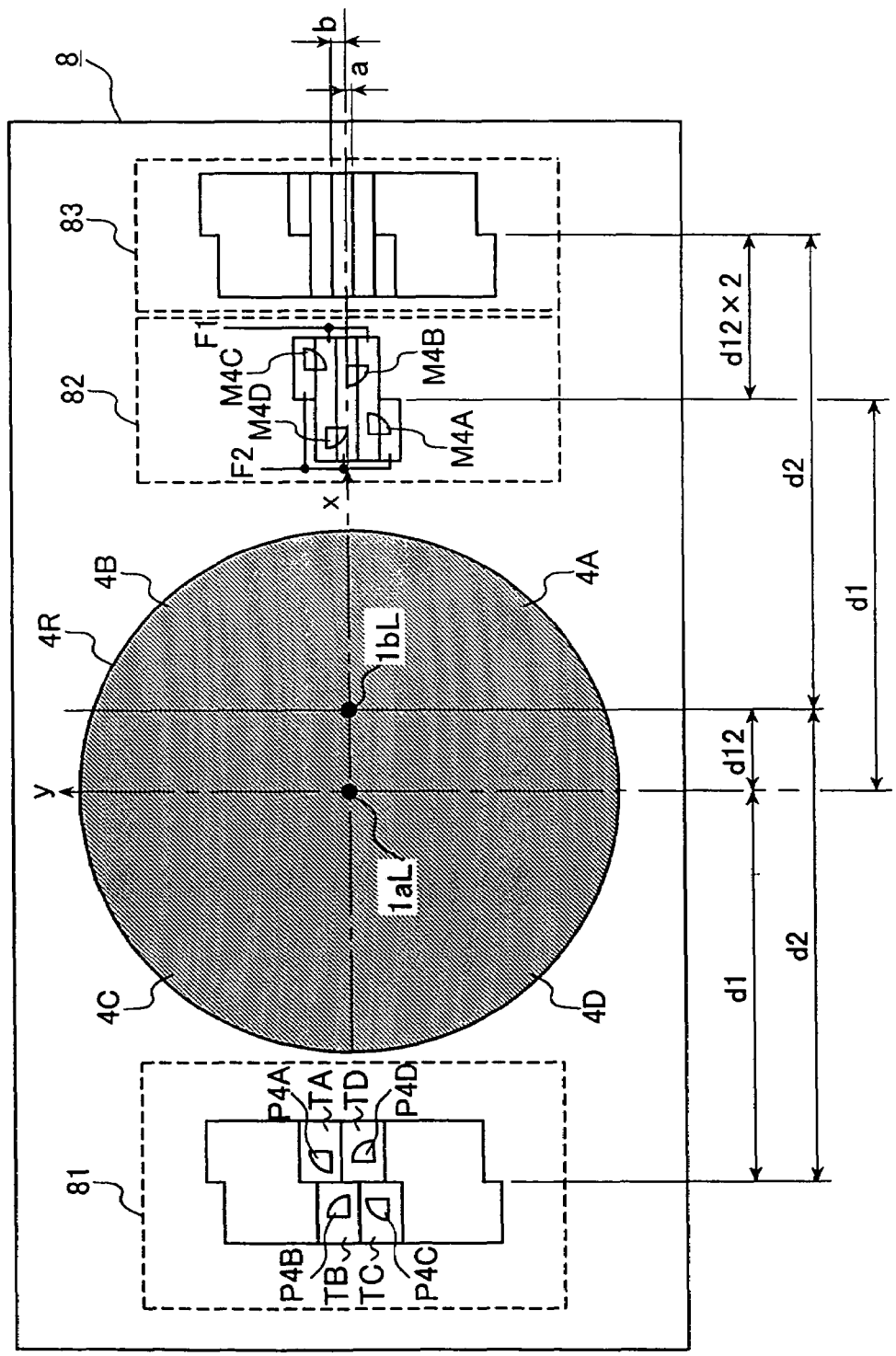
FIG. 8 is a schematic plan view showing a configuration and an operation of a photodetector according to a third embodiment of the present invention.

FIG. 8 is a view of the photodetector 8 seen from the direction perpendicular to the surface thereof. The red light spot 4R denotes an effective diameter of the red light beam on the hologram 4 (that is, a projection of the effective diameter of the objective lens 5). P4A to P4D, M4A to M4D show a projection of the diffracted light output from the hologram 4 on the photodetector 8. The infrared light spot 4R corresponds to a part of the hologram 4 and the hologram 4 is formed in the range broader than the infrared light spot 4R. 1aL denotes a light emitting spot of the red laser 1a, and the red light spot 4R on the hologram 4 expands with the light emitting spot 1aL as a center.

The photo detecting portions 81, 82, and 83 are formed on the common substrate. Therefore, it is possible to determine the positional relationship to each other precisely and easily. Furthermore, by forming also a semiconductor laser on the same substrate, the relative positional relationship with respect to the photodetecting portion becomes stable, thus enabling servo control signals to be obtained stably. Moreover, the photo detecting portions 81, 82, and 83 may be formed individually on a Si substrate, etc. in a hybrid form, or some parts of them may be formed on the common substrate.

P4A, P4B, P4C, and P4D are +first order diffracted light diffracted by the hologram 4. M4A, M4B, M4C, and M4D are −first order diffracted light diffracted by the hologram 4. The hologram 4 is divided into at least four parts by an x-axis and a y-axis. The hologram is designed so that P4A and M4A are diffracted by the region 4A, P4B and M4B are diffracted by the region 4B, P4C and M4C are diffracted by the region 4C, and P4D and M4D are diffracted by the region 4D.

A focus error signal (FE signal) can be obtained by receiving −first order diffracted light M4A, M4B, M4C, and M4D, which are diffracted by the hologram 4, at the photo detecting portion 82. For example, a wavefront is designed so that M4A and M4D are focused on the side opposite to the collimating lens 5 (see FIG. 1) with respect to the surface of the photo detecting portions 82 (this will be referred to as a rear pin); and M4B and M4C are focused on the same side as the collimating lens 5 with respect to the surface of the photo detecting portion 82 (this will be referred to as a front pin).

In other words, the wavefronts having different focusing positions are formed in the direction of the optical axis. Therefore, when a gap between the DVD optical disk 71 and the objective lens shifts in the direction of the optical axis, that is, in the front and the rear sides of the position where the converging spot is focused on the information recording surface, the magnitude of the diffracted light on the photo detecting portion 82 is changed, respectively. This change is a movement that becomes contrary to the difference in the focusing positions (for example, M4A and M4D become larger, and M4B and M4C become smaller).

Therefore, FE signals can be obtained by calculating differences of F1 and F2 from the following formula (6):

$$FE = F1 - F2 \quad (6)$$

wherein F1 and F2 respectively denote a sum of outputs of each strip region in which the sum is obtained by connecting the divided regions as shown in FIG. 8.

Furthermore, TE signals are obtained as follows. The y-direction of the photodetector 8 is adjusted to the projection direction of the direction in which a track of the DVD optical disk 71 extends (tangential direction), and the x-direction is adjusted in a radiation direction extending from the center of the disk to the outer peripheral portion (radial direction). As shown in FIG. 9, a recordable optical disk such as DVD-RAM and the like has guide grooves, and the disk is affected strongly by the diffraction of the guide grooves. Moreover, the upper half of FIG. 9 is drawn by an elevational view, and the lower half of the FIG. 9 is drawn by a plan view for ease of explanation. In FIG. 9, reference numerals 25, 26, and 27 denote a zero-order, +first-order, and −first order diffracted light due to the guide groove on the optical disk recording surface 24, respectively. Furthermore, reference numeral 84 denotes a two-divided photodetector for explanation. The photodetector 84 shows a state seen from the direction of the optical axis that is a direction perpendicular to the optical disk surface 24, the objective lens 6.

When the guide groove of the information recording surface 24 of the optical disk is irradiated with a converging spot, the reflected light is diffracted in the direction perpendicular to the direction in which the guide groove extends. An optical intensity distribution in portions A and B occurs in the far-field pattern (FFP) 28 due to the interference of the ±first order diffracted light and zero order diffracted light in the guide groove. Depending upon the positional relationship of the guide groove and the converging spot, A may be bright and B may be dark and A may be dark and B may be bright. By detecting such a change of the optical intensity by the use of a 2-divided photodetector, TE signals can be obtained by the PP method.

Figure 9:
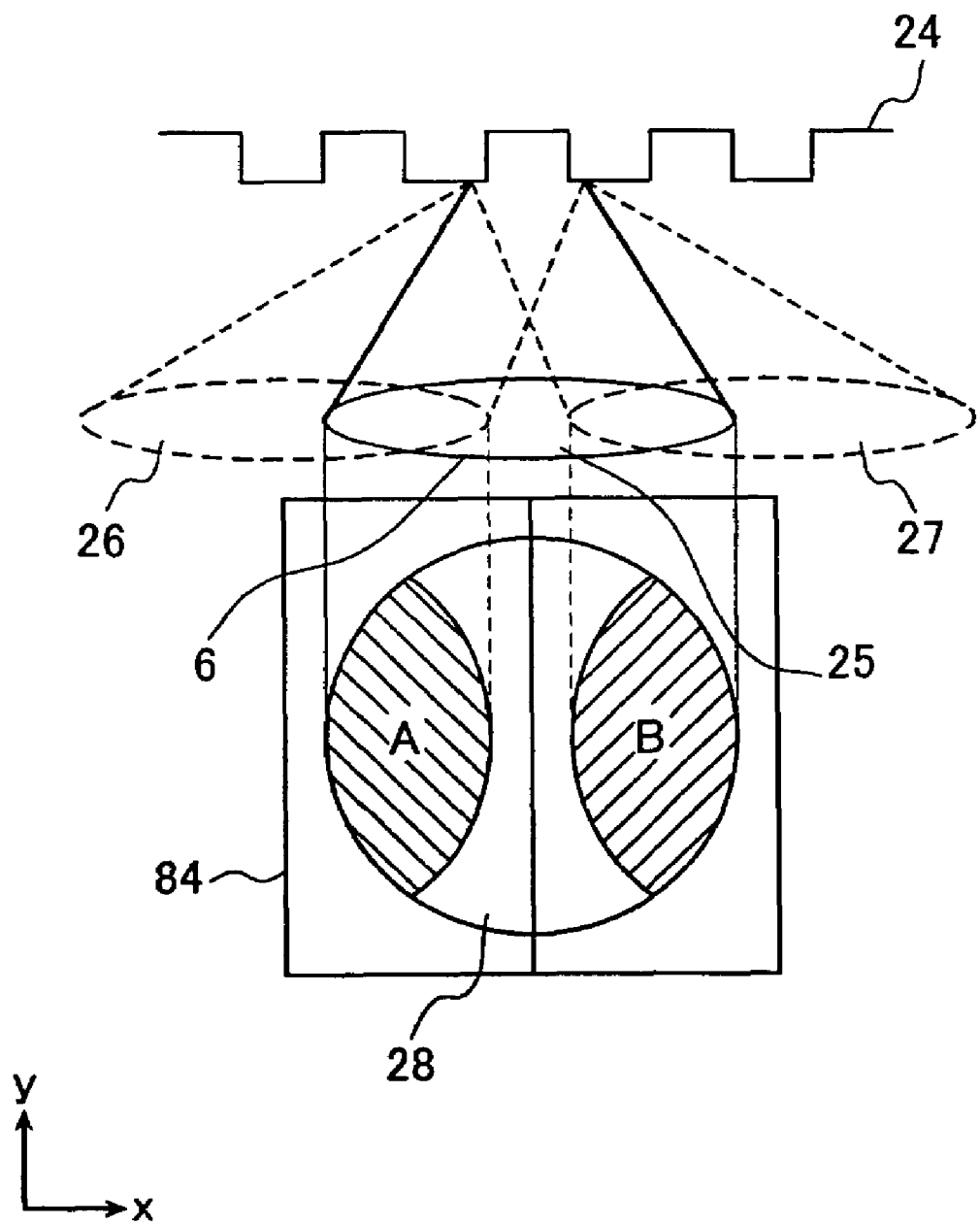
FIG. 9 is a view to illustrate an operation of a photodetector according to a third embodiment of the present invention.

In the embodiment shown by FIG. 8, since the hologram 4 (FIG. 8 only shows a red light 4R on the hologram) is positioned in the two-divided photodetector 84 in FIG. 9, when the divided regions of the hologram 4 and the divided regions of the photo detecting portion where the diffracted lights reach from each divided region are taken into account, the tracking error (TE) signals can obtained by the push-pull method by calculating from the following relationship (7).

$$TE = (TA + TB) - (TC + TD) \quad (7)$$

wherein signal strength is expressed by the name of the region (the same as true in the follows).

Furthermore, when reproducing information on DVD-ROM, it is necessary to use TE signals by the phase difference method. In such a case, however, by comparing the phase of the signal (TA+TC) with the signal (TB+TD), TE signals can be obtained by the phase difference method. Also, it is possible to detect TE signals by the phase difference method by comparing the phase of TA and TB with the phase of TC and TD.

As mentioned above, among the diffracted lights for detecting the FE signal received at the photo detecting portion 82, for example, M4A and M4D are focused on the opposite side of the collimating lens 5 (FIG. 1) with respect to the surface of the photo detecting portion 82, and M4B and M4C are focused on the same side as the collimating lens 5 (FIG. 1) with respect to the surface of the photo detecting portion 82. In other words, the diffracted light diffracted from the region 4A of the hologram 4 and the diffracted light diffracted from the region 4D of the hologram 4 have the same property.

When equalizing the property of the hologram 4 at the diffracted light diffracted from the region symmetrical to the y-axis corresponding to the tangential direction of the optical disk 7, when FE signals are detected, in the change in the amount of lights A and B described with reference to FIG. 9, both diffracted light are offset by each other. For example, when the amount of the light A is increased due to the deviation of track, the amount of the light B is reduced by the increased amount of the light A. When the change the amount of the light A and the change of the amount of the light B are added, the sum becomes zero. Therefore, even if the TE signals are changed, the FE signals are not affected by the change, and it is possible to prevent the contamination of TE signal into FE signals, i.e., the occurrence of the groove traverse signal because of the diffracted light diffracted from the regions.

Next, the information (RF) signals can be obtained from the following relationship (8):

$$RF=TA+TB+TC+TD \tag{8}$$

Furthermore, the RF signals can be obtained from the following relationship (9) by using all the ±first-order diffracted lights, and it is possible to improve the ratio of signal/noise (S/N) with respect to the electrical noise.

$$RF=TA+TB+TC+TD+F1+F2 \tag{9}$$

Moreover, as shown in FIG. 8, by forming the region 82 of the five strip shaped divided regions, it is possible to separate the diffracted light M4D from the diffracted light M4A appropriately. Furthermore, it is possible to separate the diffracted light M4B from the diffracted light M4C appropriately. Accordingly, the conjugated lights thereof, that is, the diffracted light P4D can be separated from P4A appropriately. Similarly, the diffracted light P4B can be separated from P4C appropriately. Therefore, in the photo detecting portion 81, signals of the four diffracted lights can be detected separately and thus TE signals can be obtained by the phase difference method more excellently.

Figure 10:
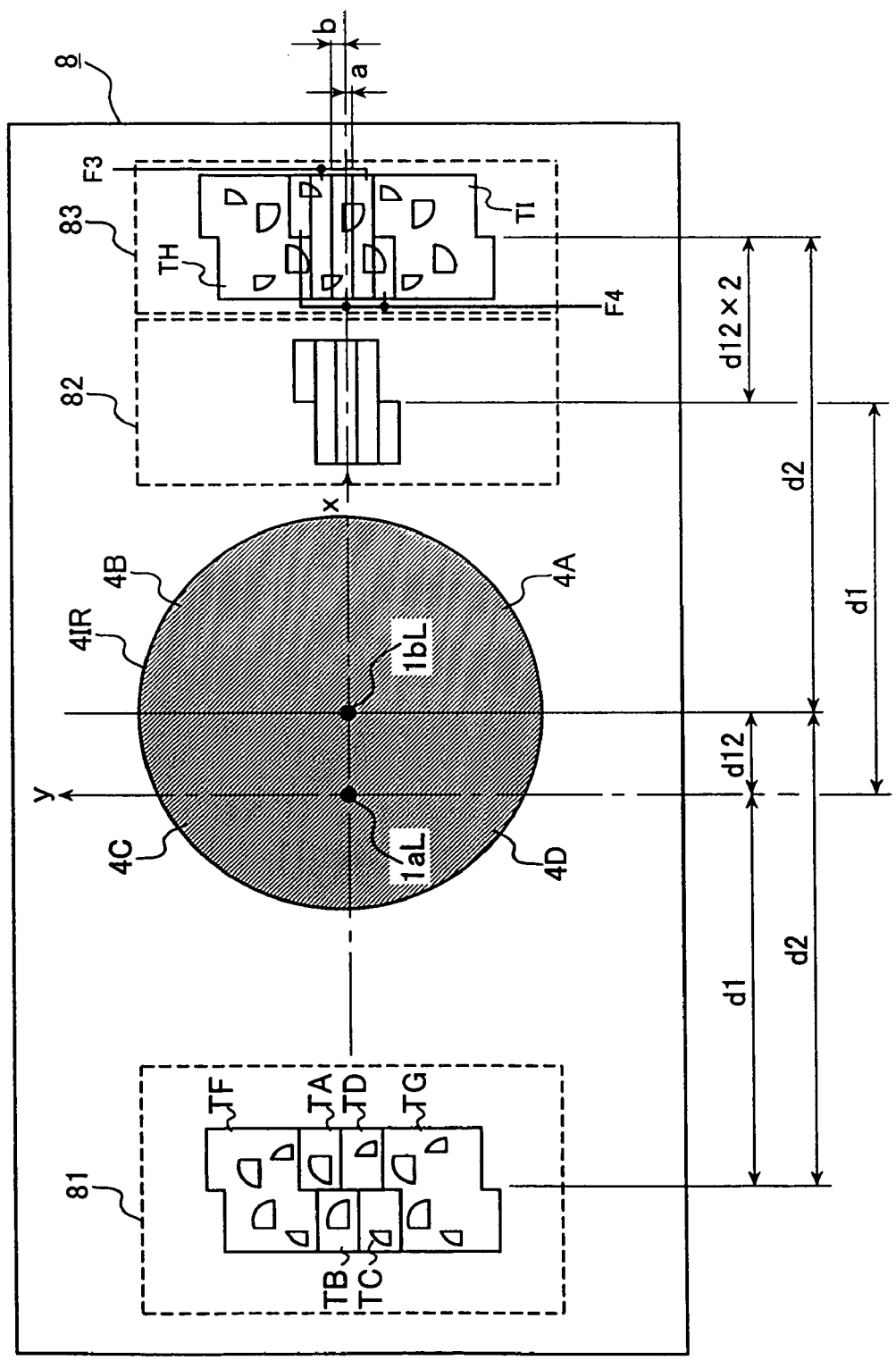
FIG. 10 is a schematic plan view showing an operation of a photodetector according to a third embodiment of the present invention.

FIG. 10 shows an operation of recording or reproducing information on a CD optical disk by emitting an infrared light in the same configuration as in FIG. 8. As shown in FIG. 3, the infrared light beam 25 is partially diffracted by the grating 3 to generate sub-beams. These sub-beams as well as the main beams are converged onto the CD optical disk 72 and reflected thereby, and enters the photo detecting portion 8. Unlike the red light beam in FIG. 8, the infrared light beam enters the photo detecting portion 81 and the photo detecting portion 83. The region of the photo detecting portion 81, in which the main beam enters, is the same as in the FIG. 8. The operation is also the same.

The region of the photo detecting portion 83, in which the main beams enter, corresponds to the region of the photo detecting portion 82 and the operation is the same. The sub-beams enter the divided regions TF and TG of the photo detecting portion 81 and the divided regions TH and TI of the photo detecting portion 83. The infrared light spot 41R of FIG. 10 shows the main beam of the red light spot 4R in FIG. 8. 1bL denotes a light emitting spot of the infrared laser 1b and the spot of the infrared light spot 41R on the hologram 4 expands around the light emitting spot 1bL as a center.

First, the production of the FE signal is described. Basically, the same explanation is applied as in the case of FIG. 8. When the gap between the CD optical disk 72 and the objection lens in the direction of the optical axis is shifted, that is, when defocusing occurs, the magnitude of the diffracted light on the photo detecting portion 83 changes. The change moves in the direction opposite to the difference of the focus position. Therefore, FE signals can be obtained by calculating differences of F3 and F4 from the following formula (10):

$$FE=F3-F4 \tag{10}$$

wherein F3 and F4 respectively denote a sum of outputs of each strip region in which the sum is obtained by connecting the divided regions of the photo detecting portion 83 as shown in FIG. 10. Moreover, since the hologram 4 is divided into four regions by the x-axis and y-axis, the magnitudes of the four diffracted lights for detecting signals of F3 and F4 are not the same as each other, which does not affect the detection of FE signal because in the hologram 4, the regions A and D and the regions B and C are a combination of a large region and a small region, respectively.

Furthermore, by connecting, for example, F1 and F3, F2 and F4 in the photodetector 8, it is possible to reduce the number of I-V amplifiers for converting a current signal obtained from the photo detecting portion into a voltage signal, or the number of the electric terminals for taking out signals from the unit to the outside, thus enabling the unit to be minimized.

The thickness of the base material of DVD is different from that of CD. Therefore, by detecting FE signals on the same shaped photo detecting portion, the offset may occur in the FE signals due to the spherical aberration. Thus, as shown in FIG. 10, the symmetric line (central line) along the x-axis of the photo detecting portion 83 is arranged by shifting it with respect to the symmetric line along the x-axis of the photo detecting portion 82. According to FIG. 10, when two dividing lines in the x-axis direction forming the central strip regions in the photo detecting portion 83 and the symmetric line of the photo detecting portion 82 are expressed by a and b, a is not equal to b. Furthermore, since the size of the diffracted light becomes different due to the effect of the wavelength spherical aberration, by changing the widths of the strips between the photo detecting portion 82 and the photo detecting portion 83, it is possible to obtain an FE signal having a high sensitivity and a broad dynamic range.

When reproducing information on CD, TE signals can be detected by the phase difference method similarly to the time of information reproduction on DVD. However, in CD-R, the 3-beam method is secured in the standardization. Therefore, for detecting TE signals, in the configuration, sub-beams entering the divided regions TF, TG, TH, and TI of the photodetector 8 are allowed to be used. TE signals by the 3-beam method can be detected by calculating the following relationship (11).

$$TE=(TF+TH)-(TG+TI) \tag{11}$$

In the photodetector 8, by interconnecting TF and TH by the use of an aluminum wiring, it is possible to reduce the number of the output terminals to the outside, and to miniaturize the unit. The same is true in TG and TI.

Furthermore, TE signals can be detected by the 3-beam method by the use of the following relationship (12) or (13):

$$TE=TF-TG \tag{12}$$

$$TE=TH-TI \tag{13}$$

In this case, it is possible to reduce the number of the output terminals to the outside and to miniaturize the unit.

Next, information (RF) signals can be obtained from the following relationship (14):

$$RF=TA+TB+TC+TD \tag{14}$$

The information (RF) signals can be obtained from the following relationship (15) by using all the ±first-order diffracted lights, thereby it is possible to improve the ratio of signal/noise (SIN) with respect to the electrical noise.

$$RF=TA+TB+TC+TD+F3+F4 \tag{15}$$

As is apparent from the above-mentioned relationships (4) and (5) and FIG. 8 or FIG. 10, a gap between the center of the photo detecting portion 82 and the center of the photo detecting portion 83 is set to be twice d12. Thereby, each center of the photo detecting portion and the center of the diffracted light can be accorded and the light can be received without leakage if there is an error in the change of the wavelength.

Furthermore, in the above-mentioned Figure, etc.. F1, F2, F3, and F4 are described in a way in which they are individual, respectively. However, for example, by interconnecting F1 and F3, and F2 and F4, it is possible to reduce the number of the output terminals to the outside and to miniaturize the unit.

Fourth Embodiment

Figure 11:
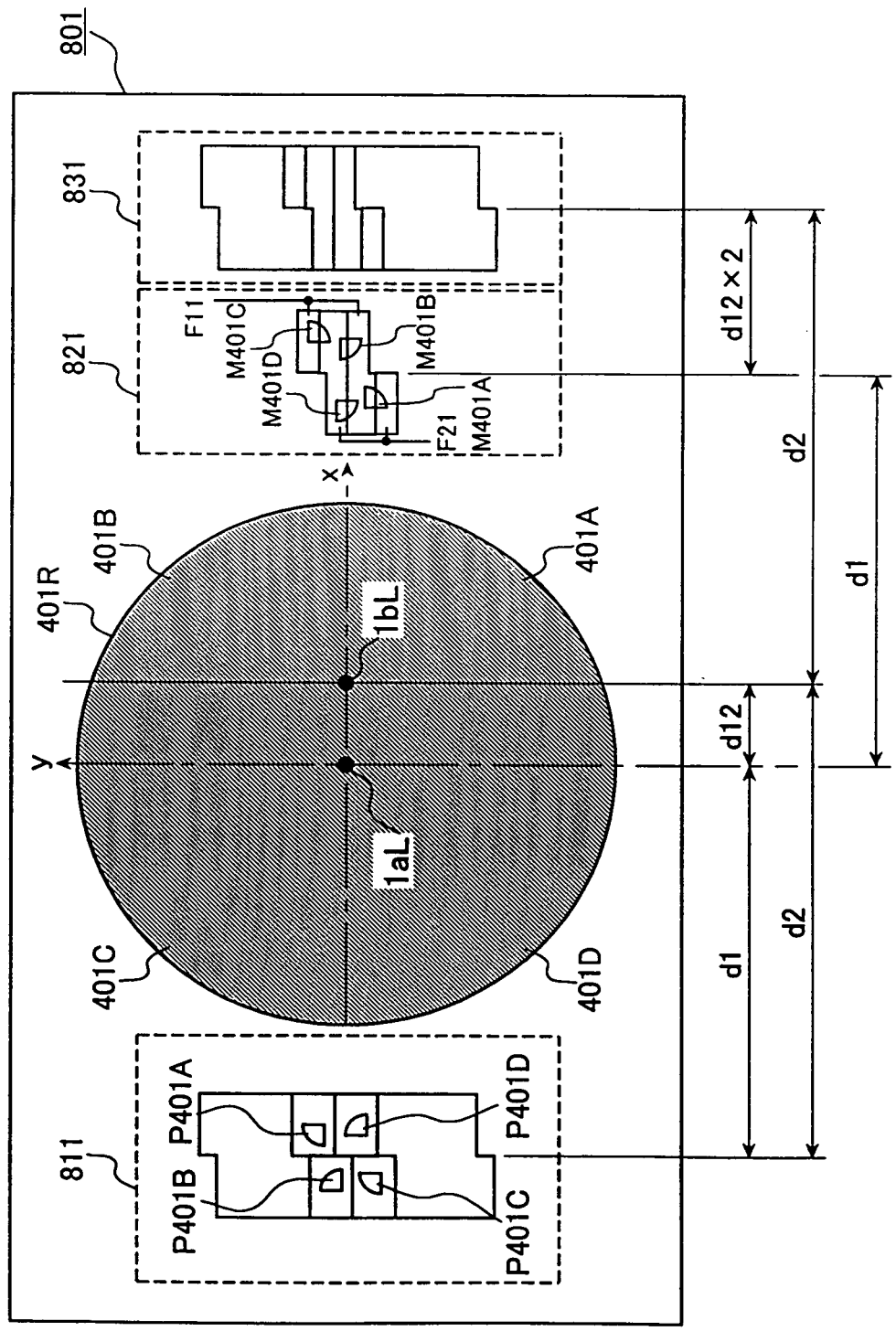
FIG. 11 is a schematic plan view showing a configuration and an operation of a photodetector according to a fourth embodiment of the present invention.

The fourth embodiment will be explained with reference to FIGS. 11 and 12. FIG. 11 is a view of the photodetector 801 seen from the direction perpendicular to the surface thereof. The red light spot 401R shows an effective diameter (that is, the projection of the effective diameter of the objective lens 5) of the light beam on the hologram. P401A to P401D, M401A to P401D show the projection on the photodetector 801 of the diffracted light generated from the hologram. The photodetector 801 corresponds to the modification of the photodetector 8 in the third embodiment. The photo detecting portions 811, 821 and 831 correspond to the modification of the photo detecting portions 81, 82 and 83 in the third embodiment respectively. Similarly, the divided regions 401A, 401B, 401C, and 401D correspond to the modification of the photo detecting portions 4A, 4B, 4C, and 4D in the third embodiment respectively.

When light is emitted from the red laser 1a, FE signals are obtained from the photo detecting portion 821. The photo detecting portion 821 includes four regions. Therefore, projections M401D and M401B are allowed to enter the same region. By reducing the number of regions as compared with the third embodiment, it is possible to reduce the area of the photo detecting portion and to reduce the effect of a stray light such as a scattered light. Therefore, FE signals can be obtained by the calculating the difference of F11 and F21 from the following formula (16):

$$FE = F11 - F21 \qquad (16)$$

wherein F11 and F21 respectively denote a sum of outputs of two regions, in which the sum is obtained by connecting the divided regions of the photo detecting portion 821 as shown in FIG. 11. TE signals and RF signals also can be obtained as in Embodiment 3.

Figure 12:
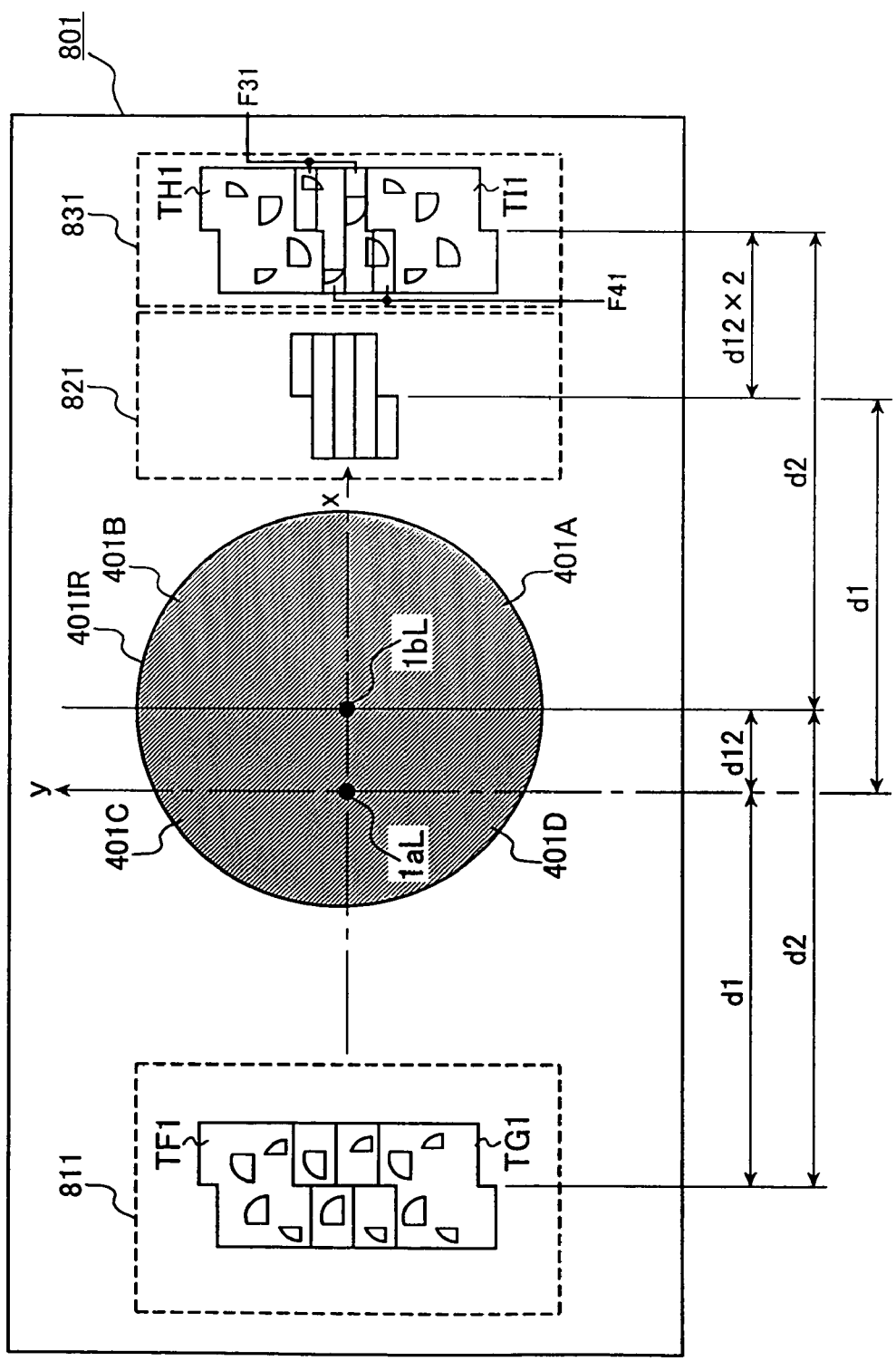
FIG. 12 is a schematic plan view showing an operation of a photodetector according to a fourth embodiment of the present invention.

FIG. 12 shows the light emitting time of the infrared laser 1b, that is, the time of the information reproduction on the CD optical disk. The infrared light spot 401IR is the same as the infrared light spot 41R in FIG. 10.

When light is emitted from the infrared laser 1b, FE signals are obtained from the photo detecting portion 831. The central portion of the photo detecting portion 831 corresponding to the photo detecting portion 821 includes four regions. Thereby, it is possible to reduce the area of the photo detecting portion and to reduce the effect of a stray light such as a scattered light. Therefore, FE signals can be obtained by calculating the difference of F11 and F21 from the following formula (16):

$$FE = F31 - F41 \qquad (16)$$

wherein F31 and F41 respectively denote a sum of outputs of two regions, in which the sum is obtained by connecting the divided regions of the photo detecting portion 831 as shown in FIG. 12. TE signals and RF signals also can be obtained as in Embodiment 3.

Since the configuration mentioned above is the same as in the third embodiment, the explanation is not repeated herein.

Fifth Embodiment

Figure 13:
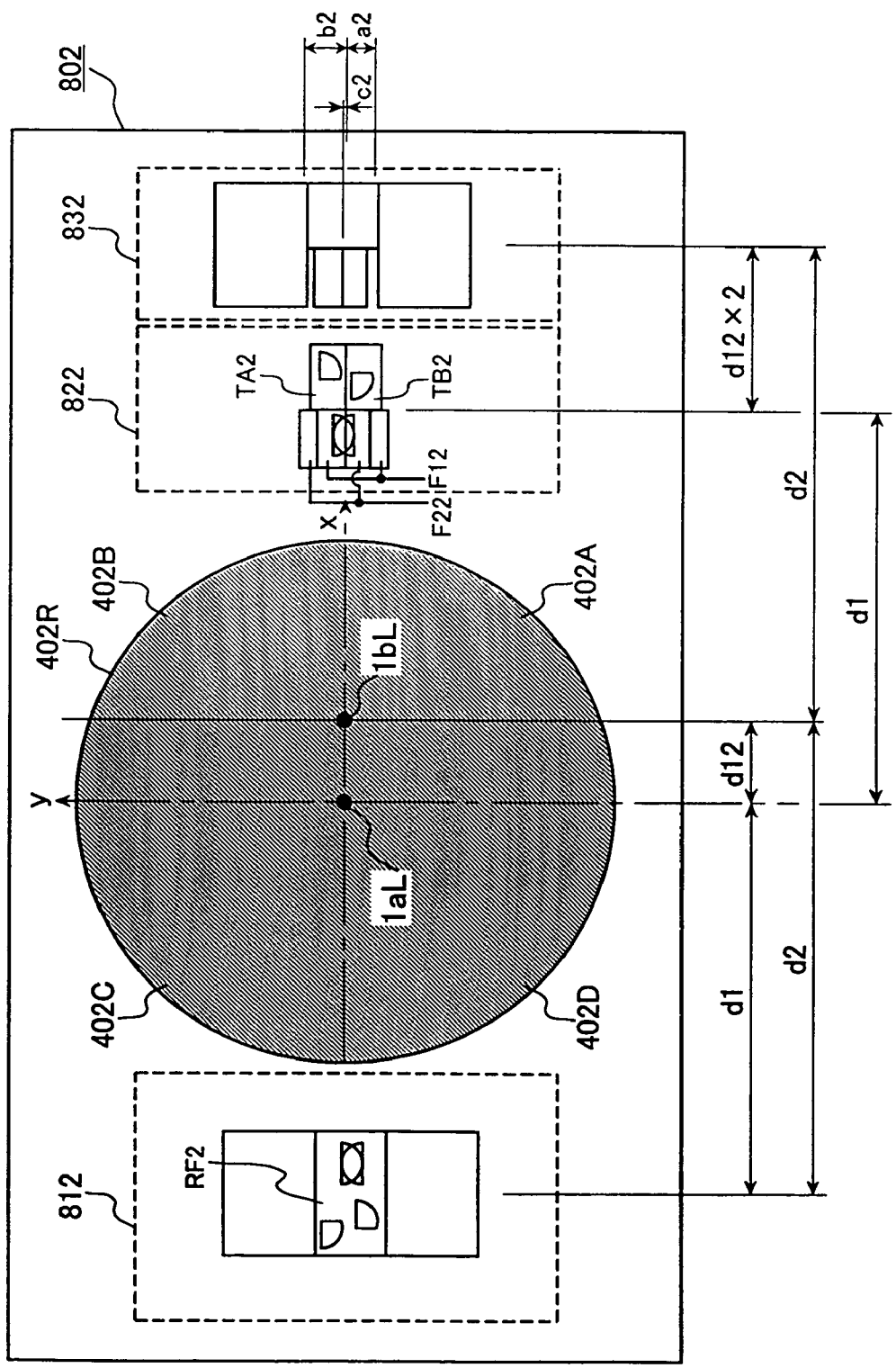
FIG. 13 is a schematic plan view showing a configuration and an operation of a photodetector according to a fifth embodiment of the present invention.

The fifth embodiment will be explained with reference to FIGS. 13 and 14. FIG. 13 is a view of the photodetector 802 seen from the direction perpendicular to the surface of thereof. The red light spot 402R shows an effective diameter (that is, the projection of the effective diameter of the objective lens 5) of the light beam on the hologram. Furthermore, the state of the diffracted light generated from the hologram on the photo detecting portions 812 and 822 is shown. The photodetector 802 corresponds to the modification of the photodetector 8 in the third embodiment. The photo detecting portions 812, 822 and 832 correspond to the modification of the photo detecting portions 81, 82 and 83 in the third embodiment respectively. Similarly, the divided regions 402A, 402B, 402C, and 402D correspond to the modification of the photo detecting portions 4A, 4B, 4C, and 4D in the third embodiment respectively.

For example, the regions 402A and 402D in the hologram 4 are treated as one region so as to generate the diffracted light having two focuses on the front side and the rear side (front pin and back pin) in the optical axis direction with respect to the photodetector 802, and then superimposed on the divided regions for obtaining the signals F12 and F22 in the photo detecting portion 822 in FIG. 13. In order to generate the diffracted light of the front pin and rear pin from the regions 402A and 402D, for example, the region is further divided into a plurality of regions by the use of dividing lines extending in parallel to the y-axis and forming the grating for generating the diffracted light of the front pin and rear pin alternately. The diffracted light of the front pin and the rear pin are converged in the front side and the rear side of the photo detector 802 with respect to the direction along the y-axis. In the direction of the x-axis, both pins are converged onto the photodetector 802 may be the focal line extending along the y-direction. Furthermore, the front side and the rear side light fluxes are not necessarily converged on one spot. The light fluxes may be converged on a focal line in which a light flux in the direction of the x-axis is converged and the light flux in the direction of the y-axis is not converged, that is, on a focal line extending in the direction of the y-axis.

The regions 402B and 402C of the hologram 4 emit the diffracted light entering the divided regions TA2 and TB2 of the photo detecting portion 822, respectively.

All of the diffracted light mentioned above are diffracted to the photo detecting portion 822. However, the conjugated light thereof enters the divided region RF2 of the photo detecting portion 812.

In the above-mentioned configuration, FE signals when the light is emitted from the red laser 1a can be obtained from the photo detecting portion 822.

The FE signal can be obtained by differential calculating signals of F12 and F22 by the following relationship (18):

$$FE = F12 - F22 \qquad (18)$$

TE signals can be detected by the push-pull method from the following relationship (19):

$$TE = TA2 - TB2 \qquad (19)$$

Furthermore, TE signals can be detected by the phase difference method by comparing the phases of TA2 and TB2.

The RF signal can be obtained from the signal in the RF2 region. In this embodiment, since it is possible to obtain the RF signal only from the region RF2, one I-V converting amplifier for RF signal, which can obtain the highest frequency property and SIN ratio, is necessary, thus minimizing the cost of the I-V converting amplifier.

Figure 14:
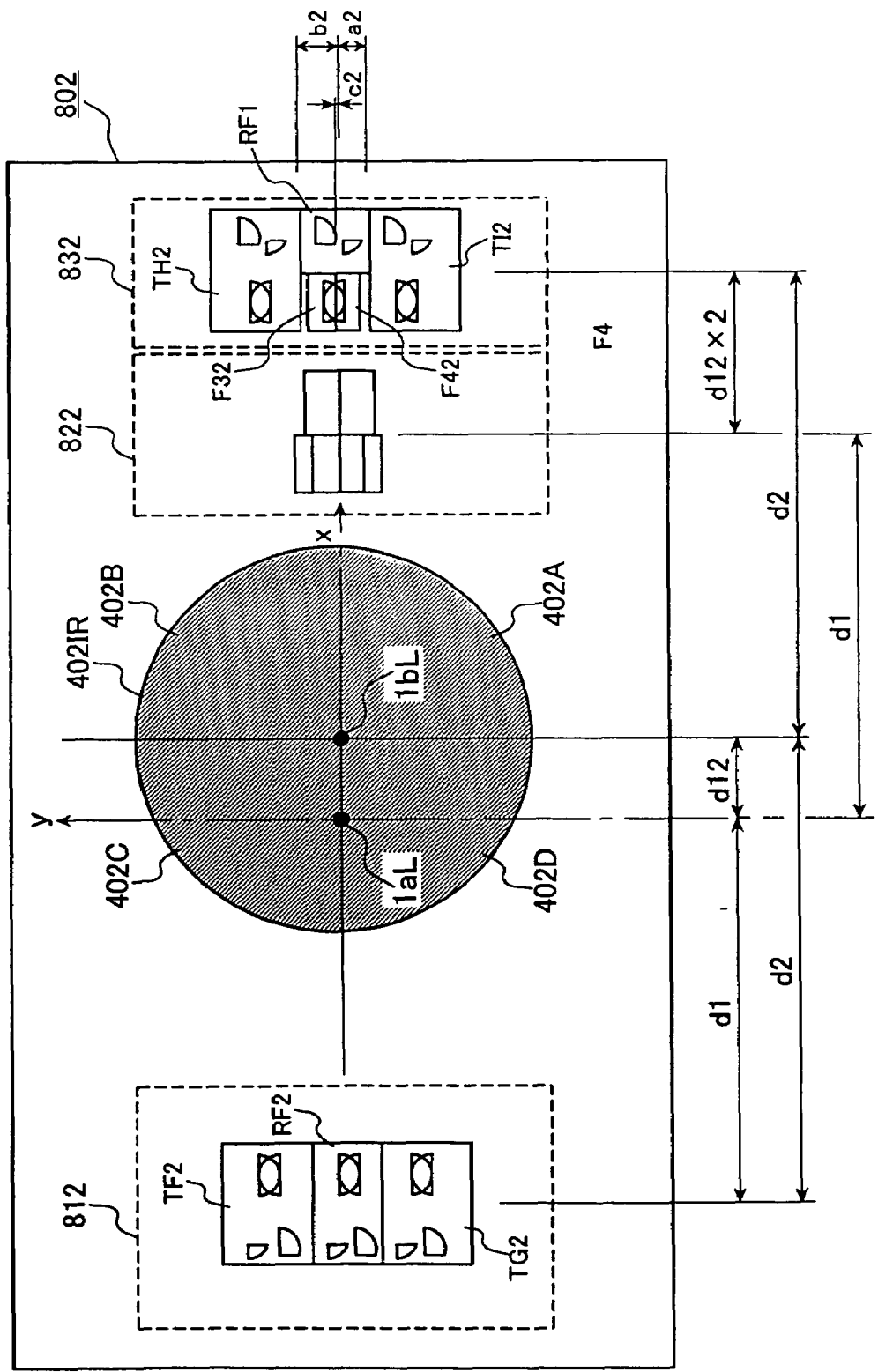
FIG. 14 is a schematic plan view showing an operation of a photodetector according to a fifth embodiment of the present invention.

FIG. 14 shows the light emission time of the infrared laser 1b, that is, the time of the information reproduction on the CD optical disk. The infrared light spot 402IR is the same as the infrared light spot 41R in FIG. 10.

The diffracted light output from the divided region 402A and 402D of the hologram 4 becomes the optical spot of the front pin and the rear pin similar to the emission time of red laser, and then enter the divided regions F32 and F42 of the photo detecting portion 832. The diffracted light generated from the divided regions 402B and 402C (the boundary line herein denotes a y-axis) of the hologram 4 enters the region RF1. All of the diffracted light mentioned above are diffracted to the photo detecting portion 822. However, the conjugated light thereof enters the divided region RF2 of the photo detecting portion 812.

Furthermore, as shown in FIG. 3, the sub-beam, which is generated by the grating 3 in the outward path and is reflected by the CD optical disk 72 and diffracted by the hologram 4, enters the divided regions TH2 and TI2 of the photo detecting portion 812 and the divided regions TH2 and TI2 of the photo detecting portion 832.

In the above-mentioned configuration, when the light is emitted from the infrared laser 1b, FE signals are obtained from the photo detecting portion 832.

FE signals can be obtained by calculating the difference of the signals of each region F32 and F42 by the use of the following relationship (20):

$$FE = F32 - F42 \qquad (20)$$

The TE signal of the 3-beam method can be obtained from the following relationship (21):

$$TE = (TF2 + TH2) - (TG2 + TI2) \qquad (21)$$

Also, the RF signal can be obtained from the signal of the region RF.

Since the configuration mentioned above is the same as in the third embodiment, the explanation is not repeated herein.

In the above-mentioned configuration, the DVD optical disk and the CD optical disk are explained as an example. However, the configuration is not limited to this alone, and the first optical disk having a transparent thickness t1 and the second optical disk t2 (t2 is different from t1) are reproduced or recorded as the optical disk 7. When t1 is set-to be 0.6 mm and t2 is set to be 1.2 mm, the disk is broadly applied to DVD optical disks and CD optical disks. However, the thickness is not limited to this alone and other combination can be applicable. Furthermore, as the wavelength, λ1 is a red laser having a wavelength of 610 nm to 680 nm and λ2 is a red laser having a wavelength of 740 nm to 830 nm. One may be a violet light having a wavelength of about 400 nm. In other words, λ1 and λ2 may be of a configuration other than the above.

Figure 15:
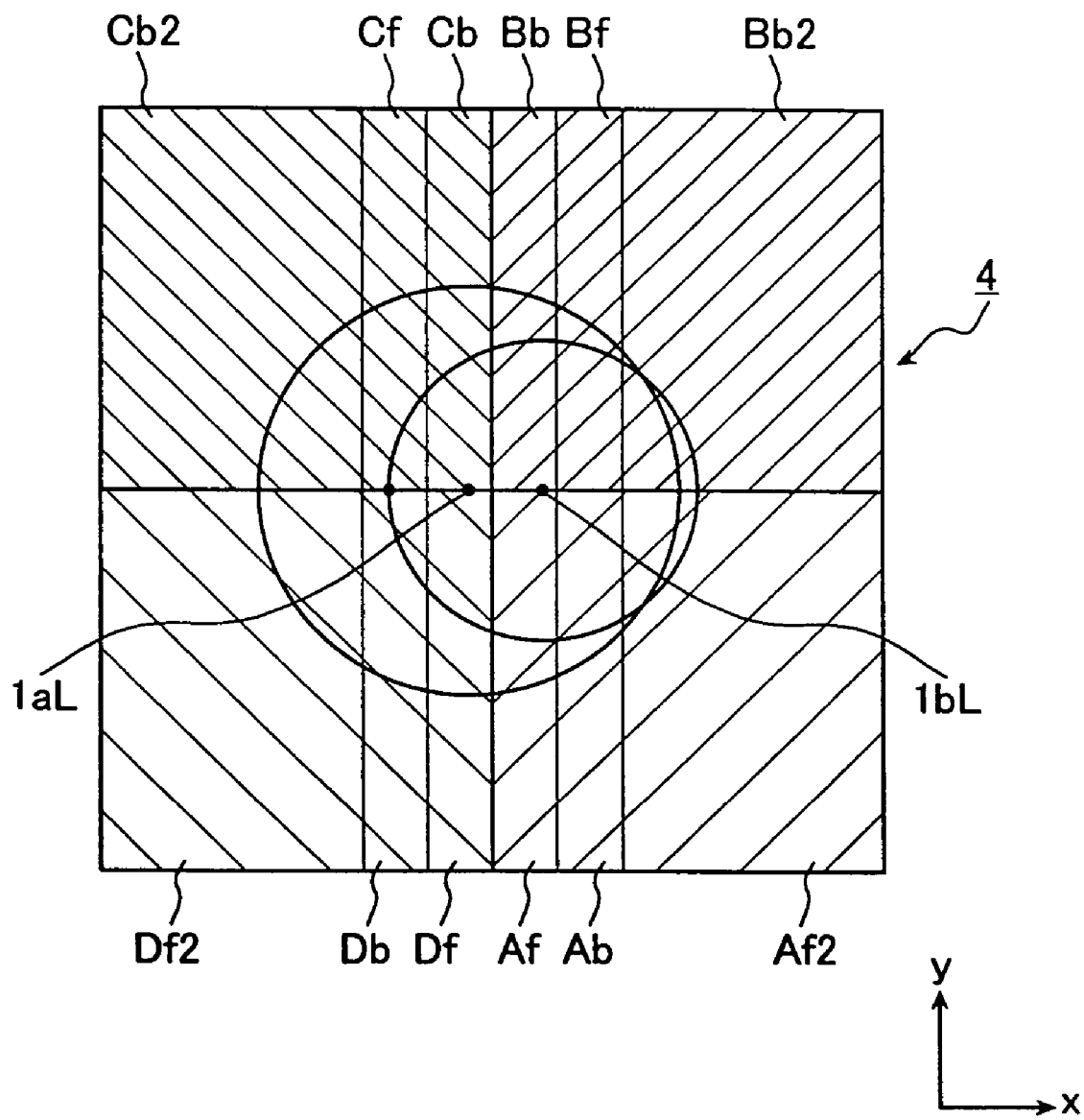
FIG. 15 is a schematic plan view showing a configuration of hologram according to a sixth embodiment of the present invention.

The main portion of the present invention explained in the above mentioned configuration includes, for example, the unit 16 shown in FIG. 15.

In the optical pick-up of the present invention, since it is possible to obtain a stable TE signal in which the offset does not occur even if the position where the hologram element is provided differs from the regular position, the information reproduction can be carried out precisely and stably. This is also a characteristic of the unit of the present invention.

Sixth Embodiment

The sixth embodiment will be explained with reference to FIG. 15. FIG. 15 is a schematic plan view showing a configuration of a hologram according to the sixth embodiment. The sixth embodiment employs a spot size detection (SSD) method for detecting focus servo signals.

As disclosed in JP2 (1990)-185722A, the SSD method is a focus error signal detecting method that enables the assembly errors for an optical head apparatus to be reduced significantly and servo signals to be obtained stably even in the change of the wavelength. Furthermore, with this method, it is possible to reduce the amount of tracking error signals entering into focus error signals.

In order to realize the SSD method, the design is carried out so that a +first-order diffracted light in the returning path generated by the hologram becomes two kinds of spherical waves, each having a different curvature. Herein, each spherical wave has a focal point on the front side or the rear side of the surface of the photo detecting portion 82 and the photo detecting portion 83 (which may be a focal line extending in the direction perpendicular to the dividing line of the photo detecting region, that is, in the y-direction in FIG. 8. Hereinafter, a front focal point and a rear focal point of the spherical wave will be referred to for abbreviation). The focus error signal can be calculated from the following formula (22):

$$FE = F2 - F1 \qquad (22)$$

Herein, F2 and F1 are electric signals obtained from some of the photo detecting regions (see, for example FIG. 8).

In order to carry out the spot size detection method, it is necessary to generate wavefronts in the front focus and the rear focal point. Furthermore, in emitting a red light, in order to prevent the occurrence of the focus offset due to lens shift or manufacturing error, or to reduce the amount of tracking error signals contaminating into focus error signals, it is desirable that a front focus wavefront generating region and a rear focal point wavefront generating region respectively (for example Bb and Bf in FIG. 15) are formed on the hologram of four quadrants (four regions divided by the y axis and x axis) on an xy-axis coordinate system with an intersection between the optical axis (the optical axis of the red light emitting spot) and the surface of the hologram as an origin.

Furthermore, also in emitting an infrared light, in order to reduce the amount of tracking error signals contaminating focus error signals, it is desirable that front focus wavefront generating region and the rear focus wavefront generating region are formed respectively on the hologram of four quadrants (four regions divided by the y axis and x axis) on xy-axis coordinate system with an intersection between the optical axis (optical axis of the red light emitting spot) and the surface of the hologram as an origin.

Therefore, in addition to forming the front focus wavefront generating region and the rear focal point wavefront generating region on each qudrant on the hologram surface with respect to red light, in order to suppress the occurrence of the offset in emitting an infrared light, one more hologram region is added (for example, Bb2 in FIG. 15).

Herein, for example, a rear focal point wavefront generating hologram is formed in the hologram regions Bb and Bb2, and a front focal point wavefront generating hologram is formed in the hologram region Bf.

As mentioned above, this embodiment is characterized in that the focus offset suppressing region is formed on the surface of the hologram. This embodiment can be combined with any of the other embodiments in the present invention. An effect capable of suppressing the focus offset in both the red light emitting time and the infrared light emitting time, and realizing the stable and accurate focus servo operation focus offset can be suppressed.

Seventh Embodiment

Figure 16:
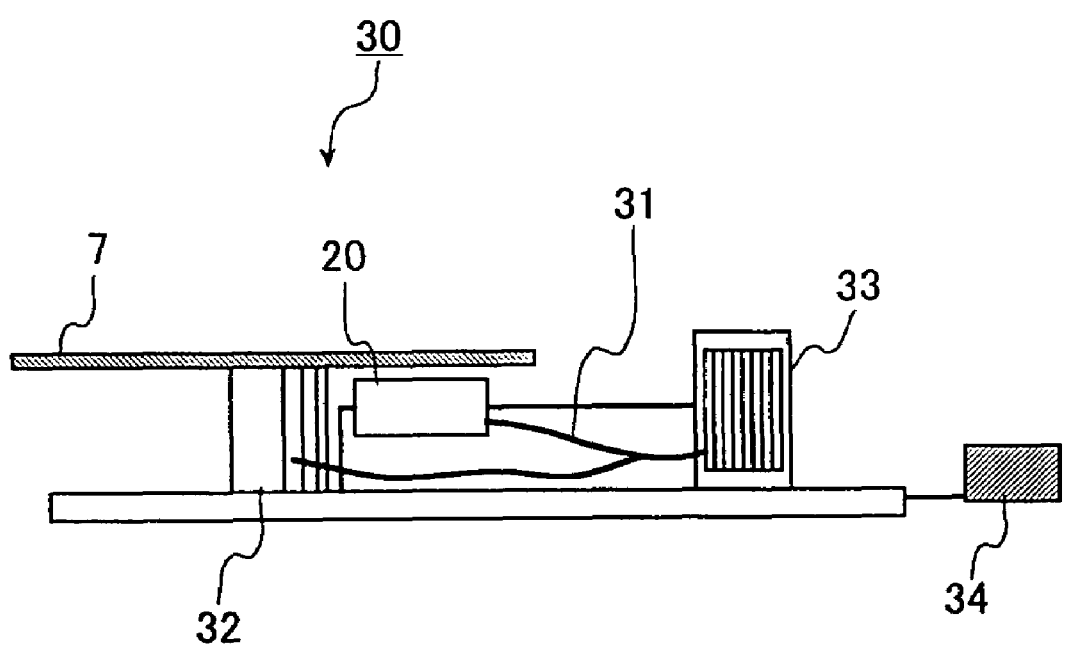
FIG. 16 is a schematic cross-sectional view showing an optical information apparatus according to a seventh embodiment of the present invention.

FIG. 16 shows an optical disk apparatus on the seventh embodiment using an optical pick up of the present invention. In FIG. 16, the optical disk 7 is rotated by the optical disk driving mechanism 32. The optical pick up 20 is moved finely (seek operation) to the position of the track in which the predetermined information of the optical disk 7 exists, by an optical pick-up driving device 31.

The optical pick-up 20 feeds a focus error signal and a tracking error signal to an electric circuit 33 in accordance with the positional relationship with respect to the optical disk 7. The electric circuit 33 responds to the signals and feeds signals for fluttering the objective lens to the optical pick-up 20. By this signal, the optical pick-up 20 carries out focus servo and tracking servo on the optical disk 7, reads out, or writes or erases information on the optical disk 7.

According to the optical disk apparatus of this embodiment, as the optical pick-up, a small size optical pick-up capable of obtaining an excellent SIN ratio at low cost is used, and it is possible to reproduce information accurately and stably. Furthermore, an effect of having a small size and low cost can be provided.

Furthermore, since the optical pick-up of the present invention has light weight and small size, the optical disk apparatus using this embodiment can achieve a shorter access time.

Eighth Embodiment

Figure 17:
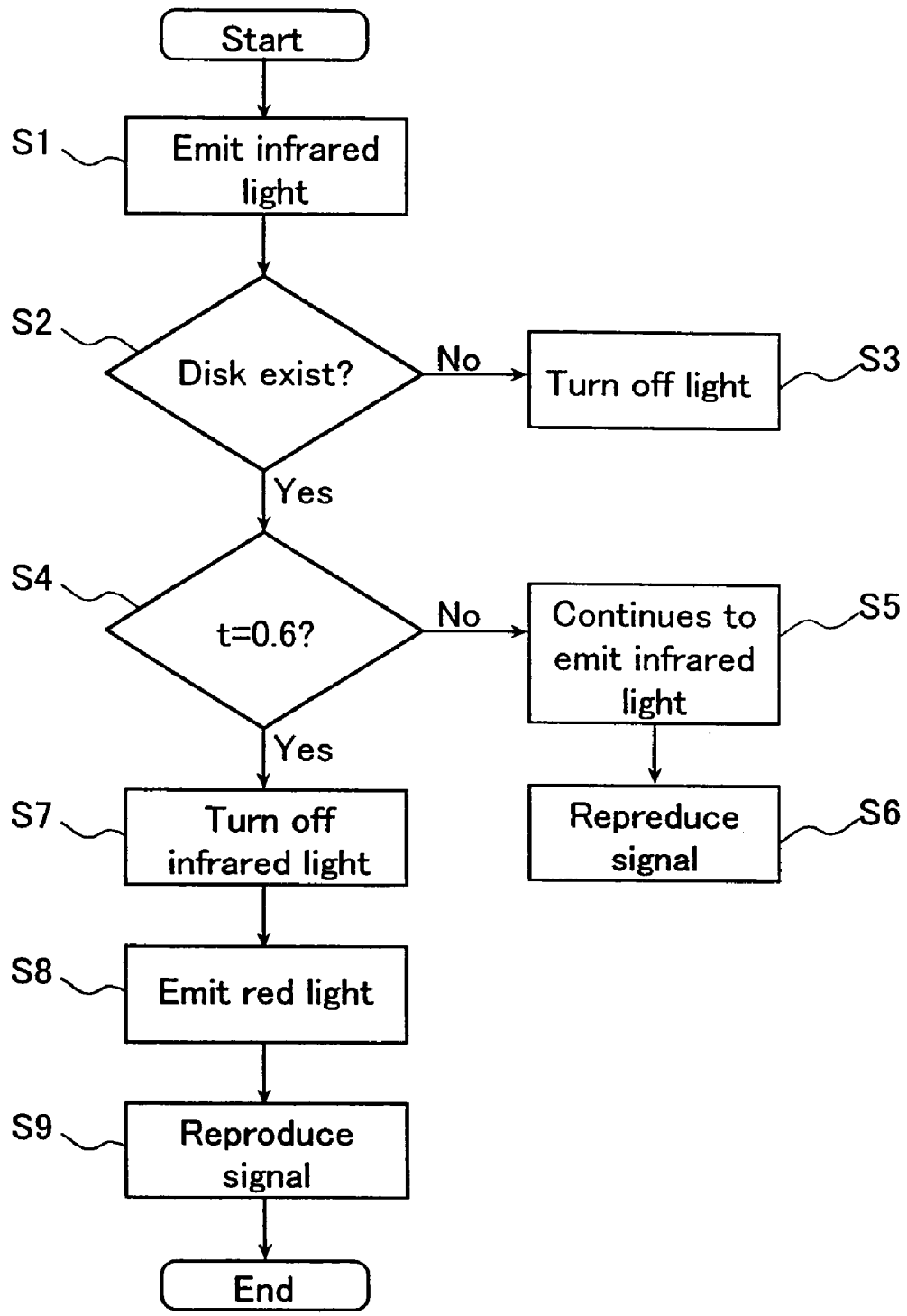
FIG. 17 is a flow chart showing a method of an optical disk recognition process according to an eighth embodiment of the present invention.

A method of an optical disk recognition process in the eighth embodiment will be described with reference to FIG. 17. This embodiment relates to an optical disk type recognition method during the start-up right after the power is turned on or after the optical disk is replaced by another. The optical disk type recognition method includes the recognition of whether or not an optical disk exists, or whether the existing optical disk is CD or DVD.

In the above-mentioned embodiments, in the optical disk apparatus having an optical pick-up using an infrared light beam and a red light beam as a light source, when the power is turned on or the optical disk is newly inserted, first, the infrared light is emitted at low output that is equal to the level at the time of reproduction of signals (step S1). Thereby, even if the optical disk is CD-R, unnecessary writing of information or wrong erasing of necessary information can be prevented. Herein, the reason why a red light is not emitted first is as follows. The reflectance of the CD-R is controlled with respect to the infrared light, but is not controlled with respect to a red light. Consequently, the red light may have an extremely high absorption.

As mentioned above, existence or nonexistence of an optical disk is determined by the existence or nonexistence of reflected light of the infrared light emitted in the above-mentioned manner (step S2), and if the optical disk does not exist, the light emission is stopped (step S3), thereby saving electric power. When the optical disk exists, by the use of the reflected light from the optical disk, the kind of the optical disk is determined (step S4). In this embodiment, the determination of the kind of the optical disk is carried out by detecting a thickness t of a transparent substrate. Since the determination of the thickness can be carried out by the use of the well known method, the specific explanation therefor is omitted herein. In this embodiment, the kinds of the optical disk are discriminated by whether the thickness t is 0.6 mm or not. The method of determination of the kinds of the optical disk may be selected appropriately in accordance with the combination of the kinds of the optical disks.

When the thickness t of the inserted optical disk is not 0.6 mm, the optical disk is judged to be CD, and in this case, emitting of the infrared light is continued (step S5), and the recording and reproducing of information starts (step S6). When the thickness t of the inserted optical disk is 0.6 mm, the optical disk is judged to be DVD, and in this case, infrared light is turned off (step S7), red light is turned on (step S8), and the information recording or reproducing on DVD is carried out (step S9).

In this embodiment, it is desirable that the optical disk type recognition method of this embodiment is carried out by the optical pick-up mentioned in the above-mentioned embodiment or combination of the above-mentioned embodiments. However, the present invention is not limited to this configurations alone and an optical pick up using a plurality of the infrared light and the other wavelength can be used. Thereby, even if the optical disk is CD-R, unnecessary writing of information or wrong erasing of necessary information can be prevented.

Ninth Embodiment

Figure 18:
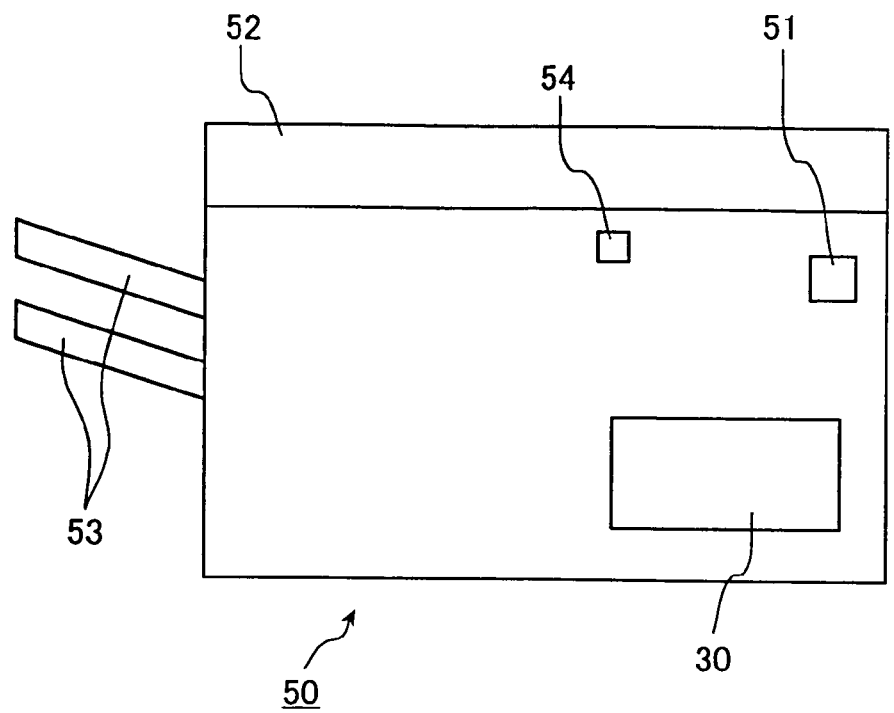
FIG. 18 is a schematic cross-sectional view showing a copying machine of a ninth embodiment of the present invention.

FIG. 18 shows a copying machine 50 according to the ninth embodiment. The copying machine 50 uses the optical pick-up or optical disk type recognition method mentioned above and includes an optical disk apparatus 30 capable of recording and/or reproducing information on the optical disk. The copying machine 50 is provided with various mechanisms included in a common copying apparatus such as a scanner capable of reading out a manuscript, a mechanism capable of feeding a copying paper, and the like. However, these mechanisms are not shown herein. Reference numeral 51 denotes information input/output terminals for transmitting information to the other equipment via a cable or a network; 52 denotes a mechanism for feeding manuscript sheet (sheet feeder), and 53 denotes a finished paper receiving holder for holding the copied paper.

The copying machine 50 has a function capable of copying on a copying paper as a usual copying machine. However, the copying machine can record information written in paper by sending information to the optical disk apparatus 30 by way of operation of the switch 54, or command sent via the information input/output terminal. At this time, the configuration capable of copying while recording is possible. With the mechanism for feeding manuscript sheet 52, a large amount of manuscript sheet can be copied and furthermore, the information printed on both surfaces of the paper can be stored as an electric information in the optical disk apparatus 30 rapidly. Thus, the storage space for information can be compressed to be a short.

Tenth Embodiment

Figure 19:
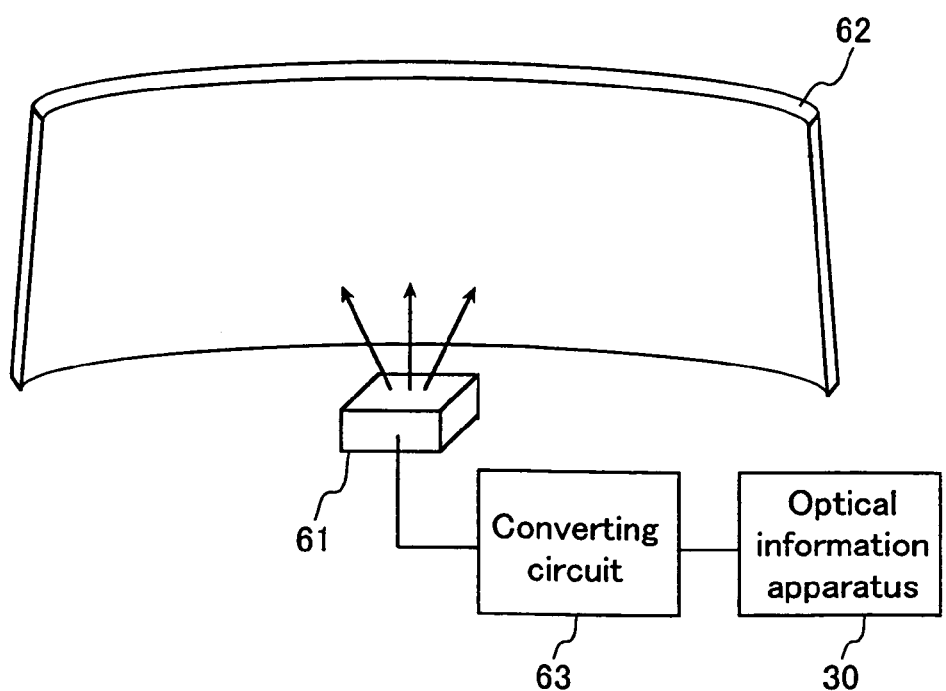
FIG. 19 is a schematic cross-sectional view showing an image projecting apparatus according to a tenth embodiment of the present invention.
Figure 20:
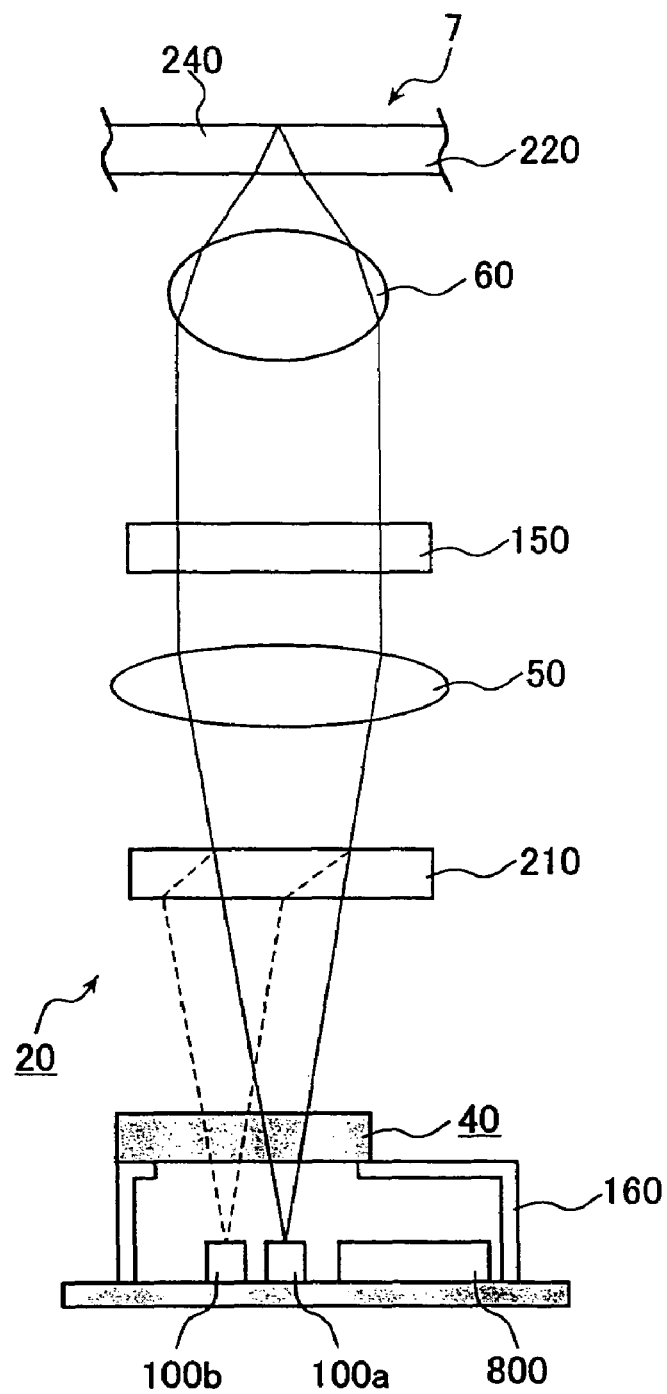
FIG. 20 is a schematic cross-sectional view showing a conventional optical pick-up.
Figure 21:
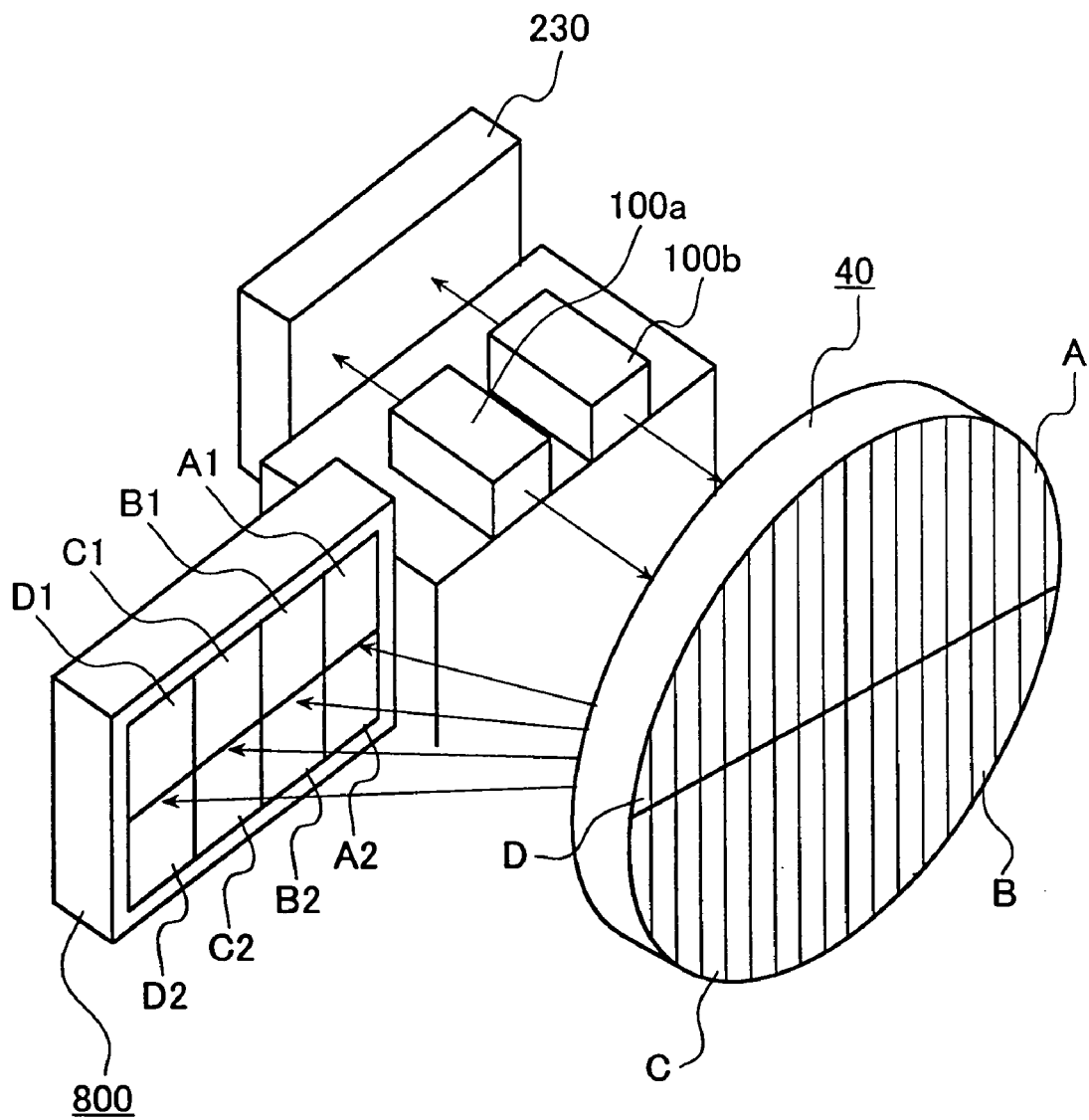
FIG. 21 is a schematic perspective view showing a main part of a conventional optical pick-up.

FIG. 19 shows an image projecting apparatus according to the tenth embodiment. This image projecting apparatus includes an optical disk apparatus 30 using an optical pick-up or optical disk type recognition method mentioned in the above-mentioned embodiment. In FIG. 19, reference numeral 62 denotes a front glass of a car; and 61 denotes an image projecting portion on which letters or pictures are depicted on the front glass of a car.

The information reproduced on the optical disk apparatus 30 are depicted onto the front glass 62 by an image projecting portion 61. The front glass 62 is basically made of transparent glass but it has reflectance of several %. Therefore, it is possible to depict the image onto the front glass. Furthermore, the front glass is not flat but has a curve, so that an image is distorted. Therefore, it is desirable that the information is processed by the use of the converting circuit 63 capable of converting information and by compensating the distortion, so an image without distortion is visible.

As mentioned above, according to the present invention, the following effects can be obtained.

Furthermore, the image to be projected may not necessarily be letters or pictures. The image may be a moving image. In particular, since the image projecting apparatus of this embodiment includes the optical disk apparatus 30, it is possible to carry out reproduction on a disk capable of recording a large capacity of data, and it is suitable for reproduction of a moving image.

(1) It is possible to reproduce information on both CD (CD-ROM, CD-R, etc.) and DVD (DVD-ROM, DVD-RAM, etc.) under significantly different conditions in terms of three factors, that is, a base material thickness, a wavelength of a light source, and NA.

(2) It is possible to obtain excellent signals at the information reproduction time on both DVD and CD with respect to the difference in the wavelength and difference in the position of the light emitting spot.

(3) It is possible to carry out the detection of TE signals by three kinds of methods, that is, the phase difference method, the PP method, and the 3-beam method, which are necessary to record or reproduce information on DVD-ROM, DVD-RAM, and CD-ROM, CD-R by the same apparatus.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. An optical disk type recognition method for determining whether an optical disk is present in an optical disk apparatus, and determining whether a disk that is present is CD or DVD, the method comprising:

by using an optical disk apparatus provided with an optical pick-up using an infrared light source and a red light source, the optical pick-up comprising a photodetector for receiving a light beam and converting the light beam into an electrical signal, the photodetector comprising: a first photo detecting portion for receiving red light emitted from the red light source and outputting a signal for detecting a focusing error signal for DVD; and a second photo detecting portion for receiving infrared light emitted from the infrared light source and outputting a signal for detecting a focusing error signal for CD, determining whether an optical disk is present by emitting the infrared light source first when the power of the optical disk apparatus is turned on, or when an optical disk is inserted into the apparatus, and determining the kinds of the optical disk by using the reflected light from the optical disk when the optical disk is present, wherein the optical pick-up comprises a diffractive optical element in an optical path through which both the red light and the infrared light pass, wherein a wavelength of the red light $\lambda 1$ and a wavelength of the infrared light $\lambda 2$ substantially satisfy the following relationship:

$$d1:d2=\lambda 1:\lambda 2$$

where d1 denotes a half distance between a center of the first photo detecting portion receiving a −first order diffracted light obtained as a result of the diffractive optical element diffracting the red light and a center of a photo detecting portion receiving a +first order diffracted light obtained as a result of the diffractive optical element diffracting the red light, and wherein d2 denotes a half distance between a center of the second photo detecting portion receiving a −first order diffracted light obtained as a result of the diffractive optical element diffracting the infrared light and a center of a photo detecting portion receiving a +first order diffracted light obtained as a result of the diffractive optical element diffracting the infrared light.

2. An optical disk recording and reproducing method, comprising:

recording or reproducing information by continuing to allow the infrared light to be emitted when the inserted optical disk is judged to be CD by the determination of the optical disk by the use of the optical disk type recognition method according to claim 1, and recording or reproducing information on DVD by extinguishing the infrared light and turning on the red light when the inserted disk is judged to be DVD by the determination of the optical disk by the use of the optical disk type recognition method according to claim 1.

3. The optical disk type recognition method according to claim 1, wherein the optical disk apparatus is an optical disk apparatus for recording or reproducing information on the optical disk, or an optical disk apparatus for recording and reproducing information, wherein the information reproduced from the optical disk apparatus is projected onto the front glass.

4. The optical disk type recognition method according to claim 1, wherein the optical disk apparatus comprises a converting circuit for converting the information reproduced by the optical disk apparatus into an image adjusted to the curvature of the front glass, wherein the information output from the converting circuit is projected onto the front glass.

5. The optical disk type recognition method according to claim 1, wherein an amount of light at a time of determination of the disk is substantially as low in power as an amount of light at a time of reproduction of data.

* * * * *